(12) United States Patent
Shao et al.

(10) Patent No.: US 12,332,068 B2
(45) Date of Patent: Jun. 17, 2025

(54) METHODS FOR PLANNING GARBAGE CLEANING ROUTE IN SMART CITIES AND INTERNET OF THINGS SYSTEMS THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Junyan Zhou, Chengdu (CN); Xiaojun Wei, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 230 days.

(21) Appl. No.: 18/174,639

(22) Filed: Feb. 26, 2023

(65) Prior Publication Data
US 2023/0221133 A1    Jul. 13, 2023

(30) Foreign Application Priority Data

Dec. 16, 2022  (CN) ......................... 202211621365.7

(51) Int. Cl.
*G01C 21/34*    (2006.01)
*A47L 11/40*    (2006.01)
*G16Y 40/60*    (2020.01)

(52) U.S. Cl.
CPC ..... *G01C 21/3476* (2013.01); *G01C 21/3492* (2013.01); *G16Y 40/60* (2020.01)

(58) Field of Classification Search
CPC . G01C 21/3476; G01C 21/3492; A47L 11/40; G05D 1/00; G05D 1/02; G16Y 40/60
See application file for complete search history.

(56) References Cited

U.S. PATENT DOCUMENTS

| | | | |
|---|---|---|---|
| 11,702,280 B2* | 7/2023 | Kurani | G06Q 10/08 |
| | | | 705/308 |
| 2016/0300297 A1* | 10/2016 | Kekalainen | G06F 17/18 |
| 2019/0360822 A1* | 11/2019 | Rodoni | H04W 4/023 |
| 2021/0024068 A1* | 1/2021 | Lacaze | G05D 1/0088 |
| 2021/0049559 A1* | 2/2021 | Kilburn | H04W 4/024 |
| 2022/0204259 A1* | 6/2022 | Moore | B25J 9/1664 |
| 2023/0260067 A1* | 8/2023 | Payette | G06Q 50/26 |
| | | | 705/325 |
| 2024/0092567 A1* | 3/2024 | Subramaniam | B65F 1/1484 |

* cited by examiner

*Primary Examiner* — Tan Q Nguyen
(74) *Attorney, Agent, or Firm* — METIS IP LLC

(57) ABSTRACT

The embodiments of the present disclosure provide a method for planning a garbage cleaning route in a smart city and an Internet of Things (IoT) system. The method is implemented by the Internet of Things system for planning a garbage cleaning route in a smart city. The IoT system includes a user platform, a service platform, a management platform, a sensor network platform and an object platform. The method is performed by the management platform. The method includes obtaining monitoring information on at least one road in a road network area, and recognizing a garbage accumulation situation on the at least one road; determining at least one target garbage cleaning point based on the garbage accumulation situation; and determining a garbage cleaning route based on the at least one target garbage cleaning point.

18 Claims, 9 Drawing Sheets

200

```
┌─────────────────────────────────────────────────┐  ╱─ 210
│ Obtaining monitoring information on at least    │ ╱
│ one road in a road network area, and            │
│ recognizing a garbage accumulation situation    │
│ on the at least one road                        │
└─────────────────────────────────────────────────┘
                         │
                         ▼
┌─────────────────────────────────────────────────┐  ╱─ 220
│ Determining at least one target garbage         │ ╱
│ cleaning point based on the garbage             │
│ accumulation situation                          │
└─────────────────────────────────────────────────┘
                         │
                         ▼
┌─────────────────────────────────────────────────┐  ╱─ 230
│ Determining a garbage cleaning route based on   │ ╱
│ the at least one target garbage cleaning point  │
└─────────────────────────────────────────────────┘
```

```
┌──────────────────────────────────────────────────────┐
│ Determining flow information on the at least one road by │  ― 310
│ obtaining the monitoring information on the at least one │
│           road in the road network area              │
└──────────────────────────────────────────────────────┘
                            │
                            ▼
┌──────────────────────────────────────────────────────┐
│   Determining the at least one target garbage cleaning   │  ― 320
│  point based on the garbage accumulation situation and   │
│                  the flow information                │
└──────────────────────────────────────────────────────┘
```

- 610 Obtaining the monitoring information on the at least one road in the road network area, and recognizing a target object on the at least one road

- 620 Determining relevant information of the target object based on a recognition result

- 630 Determining the at least one target garbage cleaning point based on the relevant information of the target object

⎡ Determining at least one road where the amount of
garbage satisfies a predetermined condition as at least
one candidate garbage cleaning point ⎤ ⟵ 810

⎡ Determining the at least one target garbage cleaning
point based on the at least one candidate garbage
cleaning point ⎤ ⟵ 820

FIG. 8

METHODS FOR PLANNING GARBAGE CLEANING ROUTE IN SMART CITIES AND INTERNET OF THINGS SYSTEMS THEREOF

CROSS-REFERENCE TO RELATED APPLICATIONS

This application claims t application No. 202211621365.7, filed on Dec. 16, 2022, the entire contents of which are incorporated herein by reference.

TECHNICAL FIELD

This present disclosure relates to the technical field of garbage cleaning, and in particular, to a method for planning a garbage cleaning route in a smart city and an Internet of Things (IoT) system.

BACKGROUND

Garbage cleaning in a city is an important part of urban governance. The urban space is relatively narrow, the population is dense, and the amount of garbage generated every day is also very large. When cleaning urban garbage, there may be some roads that are often cleaned and some roads that are not cleaned for a long time, and the garbage accumulation is serious.

Therefore, it is desirable to provide a method for planning a garbage cleaning route in a smart city and an Internet of Things (IoT) system, which can plan the garbage cleaning route, improve the cleanliness of urban roads, reduce repeated cleaning, and effectively save manpower and material resource.

SUMMARY

One of the embodiments of the present disclosure provides a method for planning a garbage cleaning route in a smart city. The method comprises obtaining monitoring information on at least one road in a road network area, and recognizing a garbage accumulation situation on the at least one road; determining at least one target garbage cleaning point based on the garbage accumulation situation; and determining a garbage cleaning route based on the at least one target garbage cleaning point.

One of the embodiments of the present disclosure provides an Internet of Things (IoT) system for planning a garbage cleaning route in a smart city. The IoT system comprises a user platform, a service platform, a management platform, a sensor network platform, and an object platform. The service platform is configured to send a garbage cleaning route to the user platform. The object platform is configured to obtain monitoring information on at least one road in a road network area, and transmit the monitoring information to the management platform through the sensor network platform. The management platform is configured to obtain the monitoring information on the at least one road in the road network area, and recognize a garbage accumulation situation on the at least one road; determine at least one target garbage cleaning point based on the garbage accumulation situation; determine the garbage cleaning route based on the at least one target garbage cleaning point; and generate a remote control command based on the garbage cleaning route and send the remote control command to the sensor network platform. The sensor network platform is configured to send the remote control command to the object platform to cause the object platform perform a cleaning operation.

One of the embodiments of the present disclosure provides a non-transitory computer-readable storage medium, the storage medium stores computer commands, and after reading the computer commands in the storage medium, a computer executes the method for planning the garbage cleaning route in the smart city of any one of the above embodiments.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein:

FIG. 2 is an exemplary flowchart of a method for planning a garbage cleaning route in a smart city according to some embodiments of the present disclosure;

FIG. 3 is a flowchart illustrating an exemplary process for determining at least one target garbage cleaning point according to some embodiments of the present disclosure;

FIG. 6 is an exemplary flowchart of a method for determining a garbage cleaning point in the smart city according to some embodiments of the present disclosure;

FIG. 8 is another flowchart illustrating an exemplary process for determining at least one target garbage cleaning point according to some embodiments of the present disclosure;

DETAILED DESCRIPTION

Figure 1:
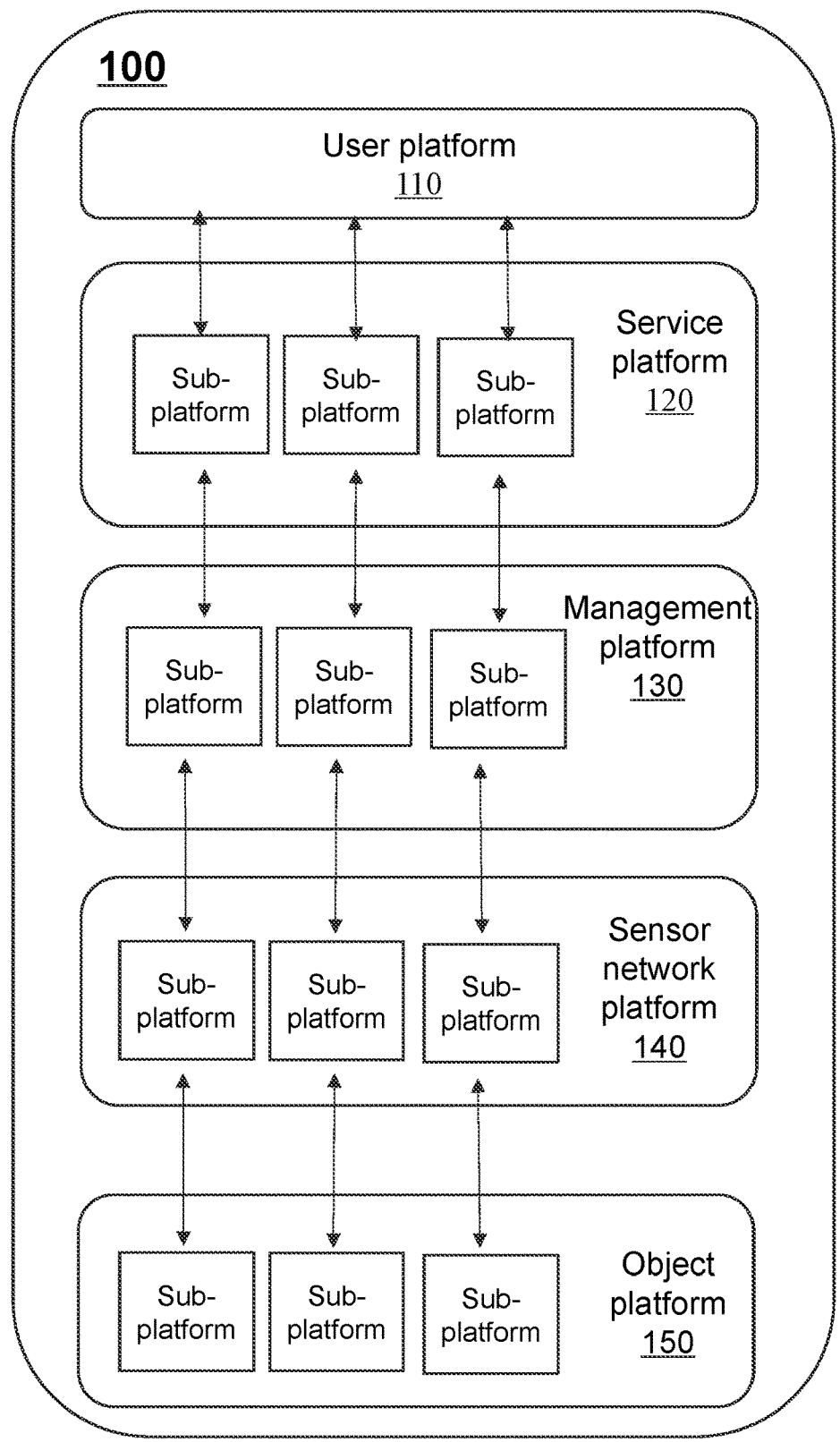
FIG. 1 is an exemplary schematic diagram of an Internet of Things (IoT) system for garbage cleaning in a smart city according to some embodiments of the present disclosure.

The technical solutions of embodiments of the present disclosure will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is an exemplary schematic diagram of an Internet of Things (IoT) system for garbage cleaning in a smart city according to some embodiments of the present disclosure. In some embodiments, the Internet of Things (IoT) system 100 for garbage cleaning in the smart city includes a user platform 110, a service platform 120, a management platform 130, a sensor network platform 140, and an object platform 150. In some embodiments, the Internet of Things (IoT) system for garbage cleaning in the smart city may include an Internet of Things (IoT) system for planning a garbage cleaning route in smart cities, an Internet of Things (IoT) system for determining a garbage cleaning point in smart city, etc. The Internet of Things (IoT) system for planning the garbage cleaning route in the smart city is mainly used to determine a route planning of garbage cleaning. The Internet of Things (IoT) system for determining the garbage cleaning point in the smart city is mainly used to determine the garbage cleaning point.

In some embodiments, the processing of information in the IoT may be divided into a processing flow of perception information and a processing flow of control information, and the control information may be information generated based on the perception information. The processing of the perception information is that the user platform 110 obtains the perception information and transmits the perception information to the management platform 130. The control information is sent to the user platform 110 by the management platform 130, so as to realize the corresponding control.

The user platform 110 is a platform that may be used to interact with a user. In some embodiments, the user platform 110 may be configured as a terminal device. For example, the terminal device may include a mobile device, a tablet computer, or the like, or any combination thereof. In some embodiments, the user platform 110 may be used to feed back the route planning of garbage cleaning and/or the garbage cleaning point of each road network area in the city to the user. In some embodiments, the user platform 110 may interact with the service platform 120 bidirectionally. The user platform 110 may send a query command of the route planning of the garbage cleaning and/or the garbage cleaning point to the service platform 120, and receive the route planning of the garbage cleaning and/or the garbage cleaning point uploaded by the service platform 120.

The service platform 120 is a platform that may be used to receive and transmit data and/or information. In some embodiments, the service platform 120 is provided with a plurality of sub-platforms according to the division of urban road network areas, and each sub-platform corresponds to at least one urban road network area. In some embodiments, the service sub-platform in each urban road network area may independently receive commands from the user platform 110, and independently feed back the route planning of the garbage cleaning and/or the garbage cleaning point in the urban road network area corresponding to the service sub-platform. In some embodiments, the sub-platform corresponding to each urban road network area in the service platform 120 may perform an independent bidirectional interaction with the sub-platform corresponding to the urban road network area in the management platform 130, send the query command of route planning of the garbage cleaning and/or the garbage cleaning point to the management sub-platform, and receive the route planning of the garbage cleaning and/or the garbage cleaning point uploaded by the management sub-platform.

The management platform 130 refers to a platform that may plan and coordinate the connection and cooperation between various functional platforms, gather all the information of the IoT, and provide the functions of perception management and control management for an IoT operation system. In some embodiments, the management platform 130 may be configured to perform the method for planning the garbage cleaning route in the smart city and/or the method for determining the garbage cleaning point in the smart city, and process the monitoring information on the at least one road in the road network area uploaded by the sensor network platform in response to a query request of the user to determine the garbage cleaning route and/or at least one target garbage cleaning point.

In some embodiments, the management platform 130 may be provided with at least one sub-platform according to the division of the urban road network areas, and each management sub-platform may correspond to the service sub-platform of the corresponding urban road network area in a one-to-one manner. In some embodiments, each management sub-platform may obtain the monitoring information of a sensor network sub-platform corresponding to the road network area and process the monitoring information, and send the route planning of the garbage cleaning and/or the garbage cleaning point obtained after processing to the service sub-platform corresponding to the road network area. In some embodiments, each management sub-platform of the management platform 130 may perform an independent bidirectional interaction with each sensor network sub-platform corresponding to the road network area in the sensor network platform 140, receive the monitoring information of each road network area uploaded by the sensor network sub-platform and process the monitoring information, and send a command for obtaining monitoring information to the sensor network sub-platform.

In some embodiments of the present disclosure, the monitoring information of different road network areas is processed by the management sub-platforms, which can reduce the data processing pressure of the entire management platform. The determination of route planning of the garbage cleaning and/or the determination of the garbage cleaning point of each urban road network area can be managed independently, which is more targeted.

The sensor network platform 140 may be a functional platform that manages sensor communication. The sensor network platform 140 may be configured as a communication network and a gateway to implement functions, such as network management, protocol management, command management, and data analysis. In some embodiments, the sensor network platform 140 is provided with at least one sub-platform according to the division of the urban road network areas, each sensor network sub-platform corresponds to the management sub-platform in the management platform 130 in a one-to-one manner, and each sensor network sub-platform may be configured as the communication network and the gateway independently. In some embodiments, each sensor network sub-platform in the sensor network platform 140 may perform a bidirectional interaction with the object sub-platform corresponding to the urban road network area in the object platform 150, receive the monitoring information uploaded by the object sub-platform corresponding to the urban road network area, and send the command for obtaining monitoring information to the object sub-platform corresponding to the urban road network area.

The object platform 150 is a functional platform that may generate perceptual information. In some embodiments, the object platform 150 is configured as a monitoring device (such as a camera device, etc.), and the monitoring device is configured with a unique identifier, which may be used to manage communities deployed in different urban road network areas of the city. In some embodiments, the object platform 150 is provided with at least one object sub-platform according to the division of the urban road network areas, and each object sub-platform corresponds to the sensor network sub-platform in the sensor network platform 140 in a one-to-one manner. In some embodiments, the object platform 150 is configured as the monitoring device with the unique identifier, each object sub-platform of which may obtain the monitoring information of the urban road network area and upload the monitoring information to the sensor network sub-platform corresponding to the urban road network area.

As shown in FIG. 1, in the Internet of Things (IoT) system 100 for planning garbage cleaning in the smart city, the "service sub-platform-management sub-platform-sensor network sub-platform-object sub-platform" in each urban area is an independent branch, which may process the monitoring information independently and in parallel and feed the monitoring information back to the user platform 110 independently.

It should be noted that the above descriptions of the Internet of Things (IoT) system and components are only for the convenience of description, and does not limit the present disclosure to the scope of the illustrated embodiments. It can be understood that for those skilled in the art, after understanding the principle of the IoT system, it is possible to arbitrarily combine the various components, or form a subsystem to connect with other components without departing from the principle. For example, the management platform 130 may be integrated in one component. As another example, each component may share one storage device, and each component may also have its own storage device. Such variations are all within the protection scope of the present disclosure.

FIG. 2 is an exemplary flowchart of a method for planning a garbage cleaning route in a smart city according to some embodiments of the present disclosure. As shown in FIG. 2, the process 200 includes the following steps. In some embodiments, the process 200 may be performed by the management platform.

Step 210: obtaining monitoring information on at least one road in a road network area, and recognizing a garbage accumulation situation on the at least one road.

The road network area refers to a road nets region composed of various roads that are interconnected and interwoven into a network-like distribution. The city may be divided into a plurality of road network areas according to actual needs.

The monitoring information refers to monitoring and control information on the road. For example, the monitoring information may include garbage information on the road, pedestrian information on the road, vehicle information on the road, etc.

In some embodiments, the management platform may obtain the monitoring information based on a monitoring device. For example, the monitoring device may be a camera, etc.

The garbage accumulation situation refers to a relevant situation of accumulation of garbage in heaps on different roads. For example, the garbage accumulation situation be represented by an amount of garbage (such as less, average, excessive, etc.), a degree of accumulation (such as level 1, level 2, level 3, etc.), a count of garbage accumulation (1, 3, 5, etc.), etc. A larger amount of garbage, a higher degree of accumulation, and/or a larger count of garbage accumulation represent that the corresponding garbage accumulation situation on the road is more serious.

In some embodiments, the management platform may recognize the garbage accumulation situation on the at least one road based on a first preset condition. The first preset condition may be a preset relevant condition of limiting the garbage accumulation situation on the road. For example, the first preset condition may be a garbage accumulation range.

Exemplarily, if the garbage accumulation range does not exceed 1 square meter, the garbage accumulation situation is less and/or level 1. If the garbage accumulation range is greater than 1 square meter but not more than 2 square meters, the garbage accumulation situation is average and/or level 2. If the garbage accumulation range exceeds 2 square meters, the garbage accumulation situation is excessive and/or level 3, etc.

As another example, the first preset condition may be a garbage accumulation height. Exemplarily, if the garbage accumulation height is less than 0.2 meters, the garbage accumulation situation is less and/or level 1. If the garbage accumulation height is greater than 0.2 meters but not more than 0.5 meters, the garbage accumulation situation is average and/or level 2. If the garbage accumulation height exceeds 0.5 meters, the garbage accumulation situation is excessive and/or level 3, etc.

As another example, the first preset condition may be the count of garbage accumulation. For example, if the count of garbage accumulation is 1, the garbage accumulation situation is less and/or level 1. If the count of garbage accumulation is greater than 1 but not more than 3, the garbage accumulation situation is average and/or level 2. If the count of garbage accumulation is greater than 3, the garbage accumulation situation is excessive and/or level 3, etc.

For example, according to the monitoring information on a road 1, if the garbage accumulation range of the road 1 at a position A exceeds 2 square meters, or the garbage accumulation height exceeds 0.5 meters, or the count of garbage accumulation exceeds 3, the management platform may recognize that the garbage accumulation situation on the road 1 at the position A is excessive and/or level 3.

As another example, according to the monitoring information on a road 2, if the garbage accumulation range of the road 2 at a position B does not exceed 1 square meter, or the garbage accumulation height does not exceed 0.2 meters, or the count of garbage accumulation is 1, the management platform may recognize that the garbage accumulation situation on the road 2 at the position B is less and/or level 1, etc.

Step 220: determining at least one target garbage cleaning point based on the garbage accumulation situation.

The target garbage cleaning point refers to a road where garbage needs to be processed. For example, the target garbage cleaning point may be a road with a degree of garbage accumulation as level 2, level 3, etc.

In some embodiments, the management platform may determine the target garbage cleaning point based on a first preset threshold. The first preset threshold refers to a preset range value of garbage accumulation situation. For example, the first preset threshold is 2 square meters, and when the garbage accumulation situation (e.g., the amount of garbage) on the road 1 at the position A is greater than the first preset threshold of 2 square meters, the management platform may determine the road 1 as the target garbage cleaning point.

In some embodiments, the management platform may preset a garbage accumulation comparison table, and determine which roads are the target garbage cleaning points by looking up the table. The garbage accumulation comparison table includes different rules for determining the target garbage cleaning points corresponding to different roads. For example, in the garbage accumulation comparison table, when the garbage accumulation situation on the road 1 at the position A exceeds the average, the road 1 is the target garbage cleaning point. As another example, when the garbage accumulation situation on the road 1 exceeds the average, the management platform may determine the road 1 as the target garbage cleaning point.

For more contents about determining the target garbage cleaning point, please refer to FIG. 3 and the related descriptions thereof.

Step 230: determining a garbage cleaning route based on the at least one target garbage cleaning point.

The garbage cleaning route refers to a route planning for cleaning the garbage at all target garbage cleaning points. For example, the garbage cleaning route may be the shortest route that passes through and cleans all the garbage at all target garbage cleaning points in sequence.

In some embodiments, the management platform may determine the garbage cleaning route based on the at least one target garbage cleaning point through a cleaning route determination model. The cleaning route determination model may be a machine learning model. In some embodiments, an input of the cleaning route determination model may be the at least one target garbage cleaning point, and an output of the cleaning route determination model may be the garbage cleaning route.

Parameters of the cleaning route determination model may be obtained through training. In some embodiments, the cleaning route determination model may be obtained by training a plurality of sets of cleaning route training samples with cleaning route labels. For example, the plurality of sets of cleaning route training samples with the cleaning route labels may be inputted into an initial cleaning route determination model, a loss function may be constructed from the cleaning route labels and output results of the initial cleaning route determination model, and the parameters of the cleaning route determination model may be iteratively updated based on the loss function. When the loss function of the initial cleaning route determination model satisfies set requirements, the model training is completed, and a trained cleaning route determination model is obtained. The set requirements may be that the loss function converges, the count of iterations reaches a threshold, or the like.

In some embodiments, each set of cleaning route training samples may include historical target garbage cleaning points on each road. Each set of cleaning route labels may be actual garbage cleaning routes corresponding to each set of cleaning route training samples. In some embodiments, the cleaning route training samples may be obtained based on the historical target garbage cleaning points, and the cleaning route labels may be obtained through manual labeling.

Figure 5:
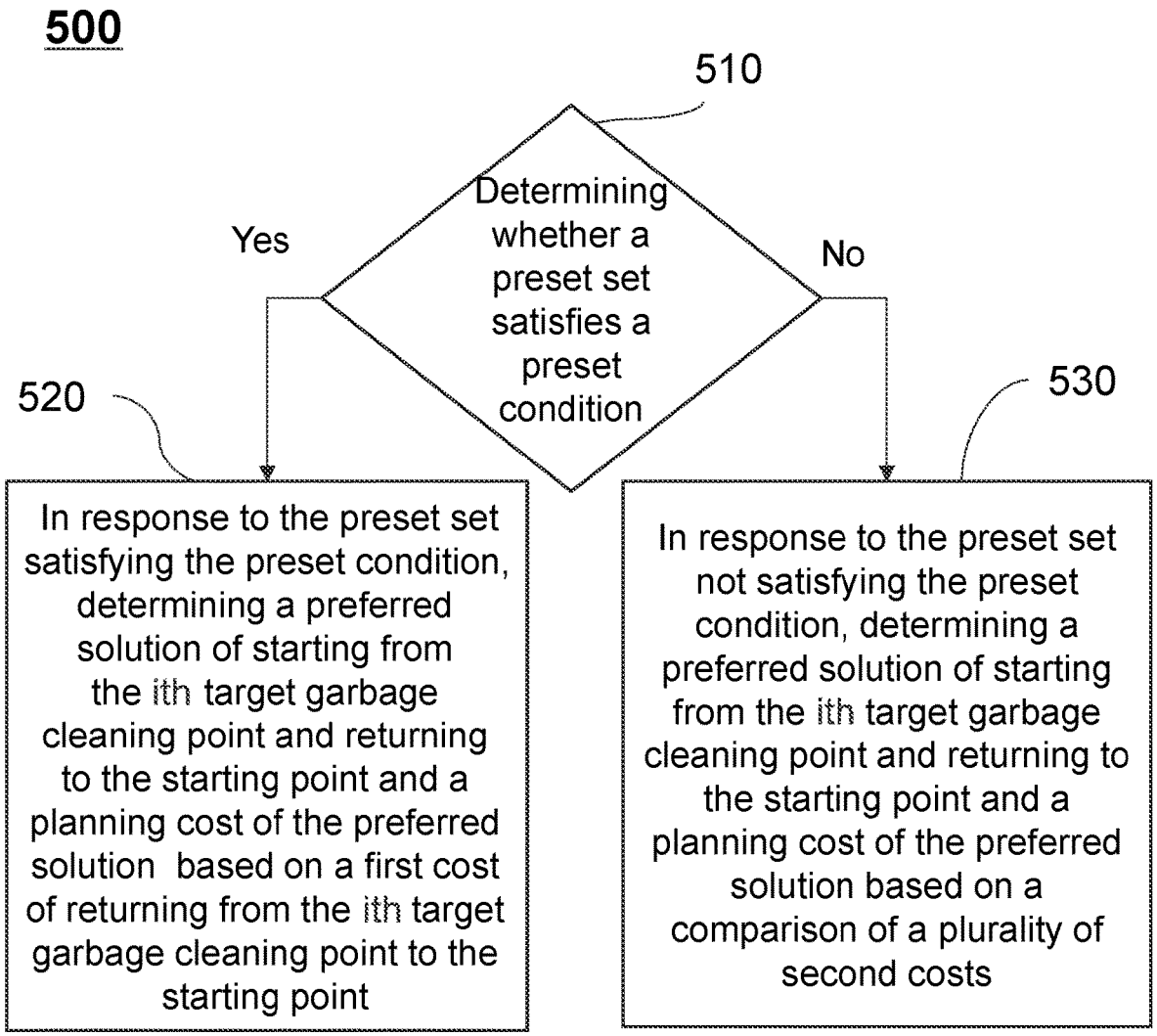
FIG. 5 is a flowchart illustrating an exemplary process for determining a garbage cleaning route according to some embodiments of the present disclosure.

For more contents about determining the garbage cleaning route, refer to FIG. 5 and the related descriptions thereof.

By obtaining the monitoring information on the road in the road network area described in some embodiments of the present disclosure, and recognizing the garbage accumulation situation on the road, the garbage accumulation situation can be obtained in real time. The target garbage cleaning point is obtained based on the garbage accumulation situation, and the garbage cleaning route is determined, which can adjust the garbage cleaning route in real-time according to the garbage accumulation situation to improve the cleanliness of the road, reduce repeated cleaning, and effectively save manpower and material resource.

In some embodiments, the management platform may generate a remote control command based on the garbage cleaning route and send the remote control command to the sensor network platform.

The remote control command refers to a control command generated remotely by a computer through operation. In some embodiments, the remote control command may be automatically generated based on the garbage cleaning route according to the Internet of Things (IoT) system for planning the garbage cleaning route in the smart city. For example, the garbage cleaning route is A-B-C-D, and the remote control command 1 is automatically generated. The garbage cleaning route is A-C-D-B, and the remote control command 2 is automatically generated.

In some embodiments, the management platform may send the remote control command to the object platform based on the sensor network platform to cause the object platform perform a cleaning operation.

The cleaning operation refers to an operation related to garbage cleaning. For example, the cleaning operation may be sweeping garbage, flushing roads, etc. In some embodiments, the object platform may perform the cleaning operation based on the remote control command. For example, when the remote control command is 1, the cleaning operation may be that the garbage is swept first, and then the road is flushed. When the remote control command is 2, the cleaning operation may be that the road is flushed first, and then the garbage is swept.

In some embodiments of the present disclosure, by generating the remote control command based on the garbage cleaning route to perform the cleaning operation, the cleaning operation can be performed in a targeted manner according to the garbage cleaning route, and the efficiency of garbage cleaning can be improved.

FIG. 3 is a flowchart illustrating an exemplary process for determining at least one target garbage cleaning point according to some embodiments of the present disclosure. As shown in FIG. 3, a process 300 includes the following steps. In some embodiments, the process 300 may be performed by the management platform.

Step 310: determining flow information on the at least one road by obtaining the monitoring information on the at least one road in the road network area.

The flow information refers to a count of flowing objects through the road within a unit time. For example, the flow information may be a count of vehicles or pedestrians passing the road within the unit time. The flow information may include a people flow. The flow information may also include a traffic flow, etc. For more contents about the traffic flow, please refer to FIG. 4 and the related descriptions thereof.

In some embodiments, the management platform may use an algorithm to determine the flow information on the road based on the monitoring information on the road in the road network area. For example, the management platform may detect and recognize objects of different shapes in the monitoring information (e.g., a video image) to obtain the flow information on the road in real-time through algorithms such as contour recognition, dynamic video tracking, stereo vision, etc.

The people flow refers to a count of people passing through the road within the unit time. For example, the count of people passing through a road 3 at 8:00-9:00 a.m. is 780. The people flow of the road 3 during this time period is 13/min. In some embodiments, the management platform may use a video algorithm to determine the people flow on the road based on the monitoring information on the road in the road network area. In some embodiments, the management platform may determine the people flow on the road based on wireless access points. For example, the people flow on the road is determined by recognizing device information of a pedestrian using a Wi-Fi probe.

In some embodiments, the flow information may also include an estimated people flow on each road of the at least one road at a future time.

The estimated people flow refers to a people flow who is possible of passing through the road at a predicted future time. The future time may be a time that is some time away from the current time point. For example, the future time may refer to a time that is half an hour, an hour, etc. away from the current time point. In some embodiments, the management platform may determine the estimated people flow through a people flow prediction model based on historical people flows on each road at a plurality of historical times. The people flows on different roads or the same road at different future times are different.

The historical people flow refers to a people flow passing through the road at a historical time. The historical time may refer to a time corresponding to the future time. For example, the future time is 9:00, and the historical time is 9:00 corresponding to a past time period (e.g., a week, half a month, a month, etc.). As another example, the current time is 8:00, the future time is 9:00, and the historical time may be 6:00, 6:10, 6:20, . . . , 7:50, 8:00, etc. on the same day. For more contents about determining the historical people flow on the road, please refer to the above description of determining the people flow.

The people flow prediction model may be used to predict the estimated people flow on each road at the future time. The people flow prediction model may be a machine learning model. For example, the people flow prediction model may be a convolutional neural network (CNN) model, a long short-term memory (LSTM) model, etc.

In some embodiments, an input of the people flow prediction model may be the historical people flows on a certain road at a plurality of historical times corresponding to the future time, and an output of the people flow prediction model may be the estimated people flow on the road at the future time.

The parameters of the people flow prediction model may be obtained through training. In some embodiments, the people flow prediction model may be obtained by training a plurality of sets of people flow training samples with people flow labels. For example, a plurality of sets of people flow training samples with the people flow labels may be inputted into an initial people flow prediction model, a loss function may be constructed based on the people flow labels and output results of the initial people flow prediction model, and the parameters of the people flow prediction model may be iteratively updated based on the loss function. When the loss function of the initial people flow prediction model satisfies set requirements, the model training is completed, and a trained people flow prediction model is obtained. The set requirements may be that the loss function converges, the count of iterations reaches a threshold, or the like.

In some embodiments, each set of people flow training samples may include historical people flows on each sample road at a plurality of historical times corresponding to the future time. Each set of people flow labels may be actual people flow corresponding to each set of people flow training samples at the future time. In some embodiments, the people flow training samples may be obtained based on the historical people flows, and the people flow labels may be obtained through manual labeling.

In some embodiments of the present disclosure, based on the historical people flows on each road at the plurality of historical times, the estimated people flow may be determined through the people flow prediction model, thereby realizing the intelligent estimation of the people flow.

Step 320: determining the at least one target garbage cleaning point based on the garbage accumulation situation and the flow information.

In some embodiments, the management platform may set a second preset threshold and a second preset condition, and when the garbage accumulation on a certain road is greater than the second preset threshold, and the flow information satisfies the second preset condition, the road is determined as the target garbage cleaning point. The second preset threshold refers to another preset range value of garbage accumulation situation. The second preset condition may be a preset relevant condition that limits the flow information on the road, and the flow information may include the people flow and/or the traffic flow. For example, the second preset threshold is 2 square meters, and the second preset condition is that the people flow is greater than 200/h and/or the traffic flow is greater than 200/h. When the garbage accumulation situation on the road (e.g., the amount of garbage) is greater than the second preset threshold of 2 square meters, and/or the people flow is greater than the second preset condition of 200 people/h and/or the traffic flow is greater than 200 vehicles/h, the management platform may determine the road as the target garbage cleaning point.

As another example, the second preset threshold is 2 square meters, and the second preset condition is that the estimated people flow is greater than 300 people/h and/or the estimated traffic flow is greater than 300 vehicles/h at future time t. When the garbage accumulation situation on the road (e.g., the amount of garbage) is greater than the second preset threshold of 2 square meters, and the estimated people flow is greater than the second preset condition of 300 people/h and/or the estimated traffic flow is greater than 300 vehicles/h at the future time t, the management platform may determine the road as the target garbage cleaning point. For more explanation about the traffic flow, please refer to the related descriptions of FIG. 4.

According to some embodiments of the present disclosure, the flow information on the road is determined by obtaining the monitoring information on the road in the road network area, and the garbage accumulation situation is combined with the flow information, which can determine the target garbage cleaning point in real time according to the actual flow situation.

Figure 4:
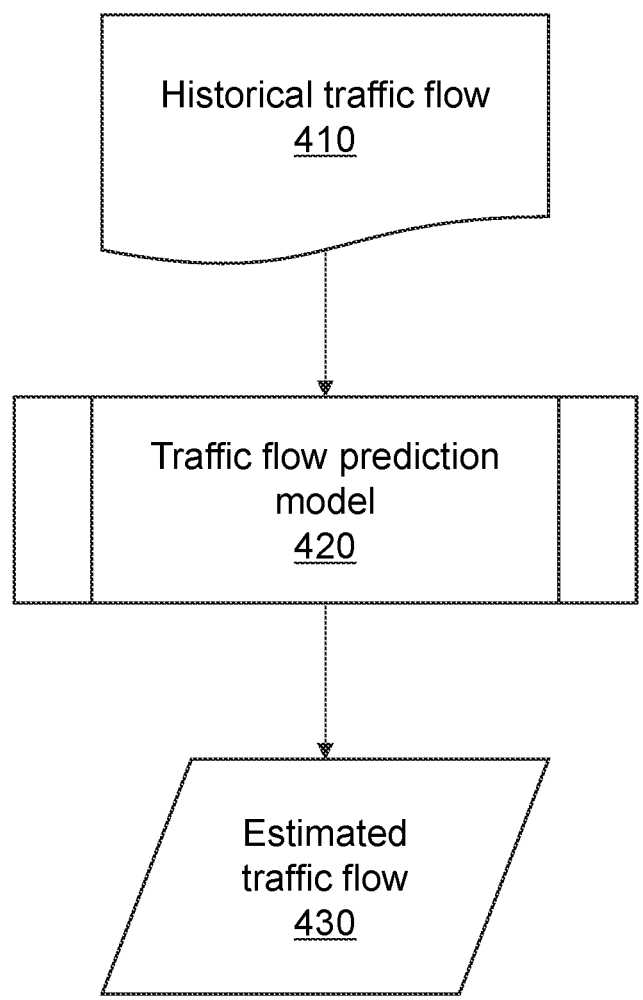
FIG. 4 is an exemplary schematic diagram of a traffic flow prediction model according to some embodiments of the present disclosure.

FIG. 4 is an exemplary schematic diagram of a traffic flow prediction model according to some embodiments of the present disclosure.

In some embodiments, the flow information may also include the traffic flow.

The traffic flow refers to the count of vehicles passing the road within a unit time period. For example, the count of vehicles passing a road 6 at 8:00-9:00 a.m. is 300. The traffic flow of the road 6 in this time period (8:00-9:00 a.m.) is 5/min.

In some embodiments, the management platform may use a video algorithm to determine the traffic flow on the road based on the monitoring information on the road in the road network area. In some embodiments, the management platform may determine the traffic flow on the road based on an induction coil combined with the monitoring information on the road in the road network area. For example, the induction coil is buried under the road, and a digital camera is installed on a crossbar for monitoring. When vehicles are driving on the road, the traffic flow on the road may be obtained in real time.

In some embodiments, the flow information may further include an estimated traffic flow on each road of the at least one road at the future time. In some embodiments, the management platform may determine the estimated traffic flow through a traffic flow prediction model based on the historical traffic flows on each road at a plurality of historical times, and the traffic flow prediction model is a machine learning model.

The estimated traffic flow refers to a traffic flow that is possible of passing through on the road at a predicted future time. The future time may be a time that is some time away from the current time point. In some embodiments, the management platform may determine the estimated traffic flow through the traffic flow prediction model based on the historical traffic flows on each road at a plurality of historical times. The traffic flows on different roads or the same road at different future times are different.

The historical traffic flow refers to the traffic flow on the road corresponding to the historical time. The historical time may refer to a time corresponding to the future time. For example, the future time is 9:00, and the historical time is 9:00 corresponding to the past time period (e.g., a week, half a month, a month, etc.). For more contents about determining the historical traffic flow on the road, please refer to the above descriptions of determining the traffic flow.

The traffic flow prediction model may be used to predict the estimated traffic flow on each road at the future time. The traffic flow prediction model may be a machine learning model. For example, the traffic flow prediction model may be a convolutional neural network (CNN) model, a long short-term memory (LSTM) model, etc.

In some embodiments, an input of the traffic flow prediction model 420 may be the historical traffic flows 410 on a certain road at a plurality of historical times corresponding to the future time, and an output of the traffic flow prediction model 420 may be the estimated traffic flow 430 on the road at the future time.

The parameters of the traffic flow prediction model 420 may be obtained through training. In some embodiments, the traffic flow prediction model 420 may be obtained by training a plurality of sets of traffic flow training samples with traffic flow labels. For example, a plurality of sets of traffic flow training samples with the traffic flow labels may be inputted into an initial traffic flow prediction model 420, a loss function may be constructed based on the traffic flow labels and the output results of the initial traffic flow prediction model 420, and the parameters of the traffic flow prediction model 420 may be iteratively updated based on the loss function. When the loss function of the initial traffic flow prediction model 420 satisfies the set requirements, the model training is completed, and the trained traffic flow prediction model 420 is obtained. The set requirements may be that the loss function converges, the count of iterations reaches a threshold, or the like.

In some embodiments, each set of traffic flow training samples may include historical traffic flows 410 on each sample road at a plurality of historical times corresponding to the future time. Each set of traffic flow labels may be the actual traffic flow corresponding to each set of traffic flow training samples at the future time. In some embodiments, the traffic flow training samples may be obtained based on the historical traffic flows 410, and the traffic flow labels may be obtained by manual labeling.

In some embodiments of the present disclosure, the estimated traffic flow may be determined based on the historical traffic flows on each road at a plurality of historical times through the traffic flow prediction model, which can realize the intelligent estimation of the traffic flow.

FIG. 5 is a flowchart illustrating an exemplary process for determining a garbage cleaning route according to some embodiments of the present disclosure. As shown in FIG. 5, a process 500 includes the following steps. In some embodiments, the process 500 may be performed by the management platform.

In some embodiments, the management platform may determine a planned route in a preferred solution of starting from an ith target garbage cleaning point and returning to a starting point as the garbage cleaning route.

The ith target garbage cleaning point refers to any garbage cleaning point that needs to be processed. For example, the ith target garbage cleaning point may be the garbage cleaning point that needs to be processed at the beginning of the garbage cleaning route, the garbage cleaning point that needs to be processed in the middle process, the garbage cleaning point that needs to be processed at the end, etc. The value of i may be a natural number, such as 1, 2, 3 . . . , etc. The maximum value of i may be the count of target garbage cleaning points.

The starting point is the location where the cleaning device starts. In some embodiments, the management platform may manually determine the location of the starting point.

The preferred solution refers to the optimal solution selected from a plurality of garbage cleaning route solutions following a principle of choosing the best by comparison. For example, the preferred solution may be a garbage cleaning route solution with the least cost of garbage cleaning route.

Step 510: determining whether a preset set satisfies a preset condition.

In some embodiments, the management platform may determine whether the preset set satisfies the preset condition. The preferred solution is determined in different ways based on different judgment results.

The preset set refers to a set of target garbage cleaning points that need to be processed. The preset set is a set of target garbage cleaning points excluding the starting point. The preset set (excluding the starting point) may be represented by S. For example, $S=\{c_1, \ldots, c_n\}$, where $c_1$ represents the first target garbage cleaning point, $c_n$ represents the nth target garbage cleaning point (1≤i≤n), and the starting point may be represented as $c_0$.

In some embodiments, the management platform may determine the preset set based on a plurality of target garbage cleaning points.

The preset condition refers to a preset relevant condition starting from the ith target garbage cleaning point and returning to the starting point. For example, the preset condition may be that the preset set is an empty set (S=∅). When the preset set satisfies the preset condition, it means that the preset set is empty and there is no target garbage cleaning point that needs to be processed. Exemplarily, when the preset set satisfies the preset condition (S=∅), the cleaning device starting from the ith target garbage cleaning point $c_i$ may directly return to the starting point $c_0$ without going through any target garbage cleaning point.

In some embodiments, the management platform may manually determine the preset condition.

In some embodiments, the management platform may determine whether the preset set satisfies the preset condition by judging whether the preset set is the empty set.

Step 520, in response to the preset set satisfying the preset condition, determining a preferred solution of starting from the ith target garbage cleaning point and returning to the starting point and a planning cost of the preferred solution based on a first cost of returning from the ith target garbage cleaning point to the starting point.

The cost refers to a cost of going from one target garbage cleaning point to another target garbage cleaning point. The cost may include a cost represented by a distance from one target garbage cleaning point to another target garbage cleaning point. The first cost refers to a cost of returning from the ith target garbage cleaning point to the starting point when the preset set satisfies the preset condition. For example, the first cost may be a cost represented by a distance from the ith target garbage cleaning point $c_i$ to the starting point $c_0$ directly. The planning cost refers to a cost of the garbage cleaning route of the preferred solution.

In some embodiments, the management platform may determine the first cost based on the cost of going from the ith target garbage cleaning point to the starting point.

In some embodiments, in response to the preset set satisfying the preset condition, the planning cost of the preferred solution of starting from the ith target garbage cleaning point and returning to the starting point may be expressed by formula (1):

$$P(c_{i\ or\ 0}, S) = D(c_{i\ or\ 0}, c_0), \text{ if } S=\emptyset \quad (1).$$

Where $P(c_{i\ or\ 0}, S)$ refers to the planning cost of the preferred solution of starting from the ith target garbage cleaning point $c_i$ or starting point to all the target garbage cleaning points in the preset set S and then returning to the starting point $c_0$. $D(c_i, c_0)$ refers to the cost of going from the ith target garbage cleaning point $c_i$ to the starting point $c_0$ (i.e., the first cost). The management platform may obtain distances from different target garbage cleaning points to the starting point through a distance matrix, and determine the corresponding first cost based on the distances. The distance matrix may represent a matrix of distances between the starting point and different target garbage cleaning points, and between different target garbage cleaning points. The distance matrix may be a preset matrix.

In some embodiments, the first cost is also related to an estimated time to reach the target garbage cleaning point. In some embodiments, the first cost is also related to an estimated garbage growth rate after cleaning of reaching the target garbage cleaning point. For the estimated time to reach the target garbage cleaning point and the estimated garbage growth rate after cleaning of reaching the target garbage cleaning point, please refer to the following description.

Step 530, in response to the preset set not satisfying the preset condition, determining a preferred solution of starting from the ith target garbage cleaning point and returning to the starting point and a planning cost of the preferred solution based on a comparison of a plurality of second costs.

The second costs refer to costs of returning from the ith target garbage cleaning point to the starting point when the preset set does not satisfy the preset condition. For example, when the preset condition is not the empty set (S≠∅), the second cost of returning from the ith target garbage cleaning point to the starting point may be a cost represented by a distance from the ith target garbage cleaning point $c_i$ to a transfer target garbage cleaning point (e.g., the jth transfer target garbage cleaning point $c_j$, and i≠j) and then back to the starting point $c_0$.

In some embodiments, the management platform may determine a plurality of second costs based on a plurality of reference solutions that going from the ith target garbage cleaning point through a plurality of transfer target garbage cleaning points and returning to the starting point. There is a plurality of situations of passing the plurality of transfer target garbage cleaning points (e.g., the order of passing is different, etc.), and each situation corresponds to a reference solution and a second cost.

The transfer target garbage cleaning points refer to one or more intermediate target garbage cleaning points passed by the garbage cleaning route of starting from the ith target garbage cleaning point and returning to the starting point. For example, the transfer target garbage cleaning points may be target garbage cleaning points excluding the ith target garbage cleaning point and the starting point (e.g., the jth transfer target garbage cleaning point $c_j$, etc., and i≠j).

In some embodiments, the management platform may determine the transfer target garbage cleaning points based on the ith target garbage cleaning point and the starting point through a transfer target garbage cleaning point determination model. The transfer target garbage cleaning point determination model may be a machine learning model. For example, the transfer target garbage cleaning points are determined based on an ith historical target garbage cleaning point and a historical starting point through the machine learning model. In some embodiments, an input of the transfer target garbage cleaning point determination model may be different target garbage cleaning points and the starting point, and an output of the transfer target garbage cleaning point determination model may be the transfer target garbage cleaning points.

The cost of going from the ith target garbage cleaning point to a plurality of transfer target garbage cleaning points may refer to the cost represented by the distance from the ith target garbage cleaning point to the plurality of transfer target garbage cleaning points. For example, the cost of going from the ith target garbage cleaning point to the jth transfer target garbage cleaning point may be the cost represented by the distance from the ith target garbage cleaning point $c_i$ to the jth transfer target garbage cleaning point $c_j$, etc.

The plurality of reference solutions may refer to the reference schemes of the garbage cleaning routes from the ith target garbage cleaning point to the plurality of transfer target garbage cleaning points and from the plurality of transfer target garbage cleaning points to the starting point.

The second costs of the reference solutions may be expressed as $D(c_{i\ or\ 0}, c_j)+P(c_j, S-c_j)$, where $D(c_{i\ or\ 0}, c_j)$ refers to the cost of going from the ith target garbage cleaning point $c_i$ or the starting point $c_0$ to the transfer target garbage cleaning point $c_j$, and the transfer target garbage cleaning point $c_j$ is included in the preset set S. Specifically, $D(c_{i\ or\ 0}, c_i)$ may be determined based on the distance obtained by an n×n distance matrix. The n×n distance matrix includes the distance between the ith target garbage cleaning point $c_i$ or the starting point $c_0$ and the jth target garbage cleaning point $c_j$. $P(c_j, S-c_j)$ refers to the minimum cost of returning from the jth transfer target garbage cleaning point $c_j$ to the starting point $c_0$. In different reference solutions, the values of i and j are different, and the values of the second costs $D(c_{i\ or\ 0}, c_j)+P(c_j, S-c_j)$ are also different.

In some embodiments, in response to the preset set not satisfying the preset condition (e.g., when $S \neq \emptyset$), the preferred solution may be the shortest garbage cleaning route from the ith target garbage cleaning point $c_i$ to the plurality of transfer target garbage cleaning points and then back to the starting point $c_0$. The planning cost may be the cost represented by the shortest distance from the ith target garbage cleaning point $c_i$ to the plurality of transfer target garbage cleaning points and then back to the starting point $c_0$.

In some embodiments, the management platform may determine the preferred solution of going from the ith target garbage cleaning point and returning to the starting point and the planning cost of the preferred solution based on the comparison of the plurality of second costs.

In some embodiments, in response to the preset set not satisfying the preset condition (e.g., when $S \neq \emptyset$), the planning cost may be expressed by formula (2):

$$P(c_{i\ or\ 0}, S) = \min_{c_j \in S}\{D(c_{i\ or\ 0}, c_j) + P(c_j, S - c_j)\}. \quad (2)$$

where $$\min_{c_j \in S}\{D(c_{i\ or\ 0}, c_j) + P(c_j, S - c_j)\}$$

refers to the minimum value among the plurality of second costs corresponding to the plurality of reference solutions when j takes different values. For example, when the starting point is $c_0$, $S=\{c1, c2, c3\}$, formula (2) may be expressed as:

$$P(c_0, S) = \min_{c_j \in S}\{D(c_0, c_j) + P(c_j, S - c_j)\} = \min\{D(c_0, c_1) + P(c_1, S - c_1),$$
$$D(c_0, c_2) + P(c_2, S - c_2), D(c_0, c_3) + P(c_3, S - c_3)\}.$$

where $P(c_1, S-c_1)$, $P(c_2, S-c_2)$, and $P(c_3, S-c_3)$ may be further split according to the above formula and recurse until all values may be obtained directly (based on formula (1)).

In some embodiments, the second cost is also related to an estimated time of reaching the target garbage cleaning point. In some embodiments, the second cost is also related to the estimated garbage growth rate after cleaning of reaching the target garbage cleaning point. For the estimated time of reaching the target garbage cleaning point and the estimated garbage growth rate after cleaning of reaching the target garbage cleaning point, please refer to the following descriptions.

According to some embodiments of the present disclosure, the planned route in the preferred solution of starting from the ith target garbage cleaning point and returning to the starting point is determined as the garbage cleaning route, and the optimal garbage cleaning route may be dynamically planned according to the target garbage cleaning point, which can improve the value of the garbage cleaning route according to a plurality of reference solutions and the actual situation of the transfer target garbage cleaning points and save manpower and material resources.

In some embodiments, the first cost and/or the second cost are also related to the estimated time of reaching the target garbage cleaning point. The estimated time of reaching the target garbage cleaning point is related to a real-time traffic flow of reaching a target garbage cleaning point of the at least one target garbage cleaning point and an estimated traffic flow at the future time.

The estimated time of reaching the target garbage cleaning point refers to an estimated time from the current location to the target garbage cleaning point. For example, the estimated time of reaching the target garbage cleaning point may be 10 minutes, 30 minutes, or the like.

In some embodiments, the estimated time of reaching the target garbage cleaning point is related to the real-time traffic flow of reaching a target garbage cleaning point of the at least one target garbage cleaning point and the estimated traffic flow at the future time. For example, a garbage truck may currently choose to go to a target garbage cleaning point A or a target garbage cleaning point B. The management platform determines that the road to the target garbage cleaning point A is relatively congested at the current time point, and the road to the target garbage cleaning point B is relatively smooth through the real-time traffic flow. It may be seen that the estimated time of reaching the target garbage cleaning point A is longer, and the corresponding first cost is larger; and the estimated time of reaching the target garbage cleaning point B is shorter, and the corresponding first cost is smaller.

As another example, the management platform determines that the road to the target garbage cleaning point A starts to be smooth after 10 minutes, and the road to the target garbage cleaning point B is relatively congested through the estimated traffic flow at the future time. It may be seen that the estimated time of reaching the target garbage cleaning point A after 10 minutes is shorter, and the corresponding first cost is smaller; and the estimated time of reaching the target garbage cleaning point B after 10 minutes is longer, and the corresponding first cost is larger. Then, after 10 minutes, going to the target garbage cleaning point A first, and then going to the target garbage cleaning point B may avoid traffic congestion.

In some embodiments, the first cost and/or the second cost relative to the estimated time of reaching the target garbage cleaning point may vary dynamically over time. For example, the current time is $t_0$, the garbage truck is currently located at the target garbage cleaning point A, and the estimated time $t_1$ from the target garbage cleaning point A to the target garbage cleaning point B is obtained through prediction. Assuming that it takes 1 h to clean at the target garbage cleaning point B, when the garbage truck completes the cleaning of the target garbage cleaning point B and goes from the target garbage cleaning point B to a target garbage cleaning point C, the current time is $t_0+t_1+1$ h. If it is necessary to predict the estimated time $t_2$ from the target garbage cleaning point B to the target garbage cleaning point C, i.e., the traffic flow from the target garbage cleaning point B to the target garbage cleaning point C at time $t_0+t_1+1$ h is required, and the estimated time $t_2$ varies with the change of the estimated time $t_1$.

According to some embodiments of the present disclosure, the first cost and/or the second cost are also related to the estimated time of reaching the target garbage cleaning point, and a garbage cleaning sequence may be better determined according to the estimated time, thereby reducing the time of road congestion through actual road condition and making the determination of the garbage cleaning route more convenient and time-saving.

In some embodiments, the first cost and/or the second cost are also related to the estimated garbage growth rate after cleaning of reaching the target garbage cleaning point.

The estimated garbage growth rate after cleaning refers to an estimated garbage increase rate of the garbage cleaning point after cleaning in a future time. For example, the estimated garbage growth rate after cleaning of the garbage cleaning point A may be 100 kg/2 h.

In some embodiments, the estimated garbage growth rate after cleaning may be obtained by processing the garbage growth rate before cleaning and the garbage accumulation situation based on a growth rate prediction model.

In some embodiments, the first cost and/or the second cost of the estimated garbage growth rate after cleaning of reaching the target garbage cleaning point may vary dynamically over time. For example, at 9:00 am, the management platform may choose to go to the target garbage cleaning point A or the target garbage cleaning point B first. If the management platform may choose to go to the target garbage cleaning point A for cleaning first, the estimated garbage growth rate after cleaning (e.g., after 10 o'clock, etc.) of the target garbage cleaning point A when the cleaning of the target garbage cleaning point A is completed (the cleaning is completed at 10 o'clock, etc.) may be determined. The estimated garbage growth rate after cleaning (e.g., after 12 o'clock, etc.) of the target garbage cleaning point B may be determined according to the time of reaching the target garbage cleaning point B (e.g., reaching at 10:30, etc.) and the time required for completing the cleaning (e.g., 1.5 hours, etc.).

The management platform may determine the first cost/second cost based on the estimated garbage growth rates after cleaning of two target garbage cleaning points. The management platform may also determine the respective estimated garbage growth rates after cleaning when the target garbage cleaning point B is cleaned first and then the target garbage cleaning point A is cleaned based on the above manner, and determine the corresponding first cost/second cost. Since the time for cleaning each target garbage cleaning point in the two manners is different, the estimated garbage growth rates after cleaning are also different, so the impact on the first cost/second cost is different.

The growth rate prediction model may be used to predict the garbage growth rate at the future time after the road is cleaned. The growth rate prediction model may be a machine learning model.

In some embodiments, an input of the growth rate prediction model may be the garbage growth rate before cleaning and the garbage accumulation situation, and an output of the growth rate prediction model may be the estimated garbage growth rate after cleaning. The time corresponding to the estimated garbage growth rate after cleaning is the estimated future time after cleaning. For example, the current time is 08:00, and the estimated time after cleaning is 09:00. The estimated garbage growth rate after cleaning is the garbage growth rate corresponding to 09:00 at the future time.

The parameters of the growth rate prediction model may be obtained through training. In some embodiments, the growth rate prediction model may be obtained by training a plurality of sets of estimated growth rate training samples with estimated growth rate labels. For example, the plurality of sets of estimated growth rate training samples with the estimated growth rate labels may be input into an initial growth rate prediction model, a loss function may be constructed based on the estimated growth rate labels and the output results of the initial growth rate prediction model, and the parameters of the growth rate prediction model may be iteratively updated based on the loss function. When the loss function of the initial growth rate prediction model satisfies the set requirements, the model training is completed, and a trained growth rate prediction model is obtained. The sett requirements may be that the loss function converges, the count of iterations reaches a threshold, or the like.

In some embodiments, each set of estimated growth rate training samples may include a sample garbage growth rate before cleaning and a sample garbage accumulation situation. Each set of estimated growth rate labels may be an actual garbage growth rate after cleaning at the future time corresponding to each set of estimated growth rate training samples. In some embodiments, the estimated growth rate training samples may be obtained based on historical garbage growth rate before cleaning and the garbage accumulation situation, and the estimated rate labels may be obtained by manual labeling.

Through obtaining the estimated garbage growth rate after cleaning by processing the garbage growth rate before cleaning and the garbage accumulation situation based on the growth rate prediction model described in some embodiments of the present disclosure, a relatively dirty road environment can be cleaned in time to avoid garbage accumulation. Combined with the estimated garbage growth rate after cleaning as the relevant quantity of the cost, the determination of the garbage cleaning route can be more accurate.

In some embodiments, the input of the growth rate prediction model further includes the people flow of the target garbage cleaning point and the estimated people flow of the target garbage cleaning point at the future time.

The people flow of the target garbage cleaning point refers to the count of people passing through the target garbage cleaning point within the unit time. For example, the count of people passing through the target garbage cleaning point A at 8:00-12:00 a.m. is 3000, and the people flow of the target garbage cleaning point A within this time period is 750 people/h or 13 people/min. For more contents about determining the people flow, please refer to FIG. 2 and the related descriptions thereof.

The estimated people flow of the target garbage cleaning point at the future time refers to an estimated people flow that is possible of passing through the target garbage cleaning point at the future time. In some embodiments, the management platform may determine the estimated people flow through the people flow prediction model based on the historical people flows on each target garbage cleaning point at a plurality of historical times. For more contents about the estimated people flow and the people flow prediction model, please refer to FIG. 3 and the related descriptions thereof.

In some embodiments, each set of estimated growth rate training samples further includes the people flow of a sample target garbage cleaning point and the estimated people flow of the sample target garbage cleaning point at the future time.

According to some embodiments of the present disclosure, the input of the growth rate prediction model includes the people flow of the target garbage cleaning point and the estimated people flow of the target garbage cleaning point at the future time, which can make the growth rate prediction model more accurately determine the estimated garbage growth rate after cleaning of the target garbage cleaning point. On the other hand, by timely cleaning the growing garbage on the road, the accumulation of garbage caused by the crowd effect can be avoided, and road cleanliness can be effectively maintained.

FIG. 6 is an exemplary flowchart of a method for determining a garbage cleaning point in the smart city according to some embodiments of the present disclosure. As shown in FIG. 6, a process 600 includes the following steps. In some embodiments, the process 600 may be performed by the management platform.

Step 610, obtaining the monitoring information on the at least one road in the road network area, and recognizing a target object on the at least one road.

For more contents about the road network area and the monitoring information, please refer to FIG. 2 and the related descriptions thereof.

The target object refers to an object that needs attention during garbage cleaning. In some embodiments, the target object may at least include garbage to be processed. The garbage to be processed refers to garbage that needs to be cleaned up, such as tree leaves, packaging boxes, beverage bottles and other garbage on the road.

In some embodiments, the management platform may obtain the monitoring information on the at least one road in the road network area through the object platform. The management platform may perform image recognition on the monitoring information to determine the target object. For example, the management platform may compare a contour in the monitoring information with a contour in a standard image information base, and recognize the target object according to a comparison result. The standard image information base may contain contours of common objects on the road. The management platform may build the standard image information base based on image pixel information of the common objects on the road. In some embodiments, the management platform may continuously obtain the monitoring information, and then may recognize the target objects on different roads at different times.

In some embodiments, the target object may also include pedestrians. For more contents about pedestrians, please refer to FIG. 7 and the related descriptions thereof.

Step 620, determining relevant information of the target object based on a recognition result.

The recognition result refers to a result obtained by recognizing the target object contained in the monitoring information, such as the garbage to be processed, pedestrians, etc., in the image of the monitoring information.

The relevant information of the target object refers to information related to the target object. In some embodiments, the relevant information of the target object may at least include the amount of garbage to be processed, or the like.

The amount of garbage to be processed refers to the quantity of garbage to be processed. The amount of garbage to be processed may be expressed in various ways. For example, the amount of garbage to be processed may be expressed by the count of garbage to be processed, the area covered by the garbage to be processed on the road, the volume of the garbage to be processed, the count of heaps of garbage to be processed, etc. The amount of garbage to be processed may be set as different levels (such as none, less, average, more, a lot, etc.) according to the count and/or coverage area on the road, volume, etc.

In some embodiments, the relevant information of the target object may also include a location of the garbage to be processed on the road, or the like.

In some embodiments, the management platform may determine the amount of garbage to be processed on different roads in various ways. For example, the management platform may count the target objects included in the monitoring information based on the recognition results on different roads to determine the amount of garbage to be processed on different roads.

Exemplarily, the management platform may calculate the ratio of pixels of the garbage to be processed in the image of the monitoring information to total pixels in the image, and then calculate the coverage area of the garbage to be processed on different roads by the ratio and the total area of the road in the image. The management platform may determine the level of the amount of garbage to be processed on different roads according to a preset level rule (e.g., the coverage area less than 1 square meter is less, the coverage area between 1 square meter and 5 square meters is average, and the coverage area more than 5 square meters is more). As another example, the management platform may determine the amount of garbage to be processed by counting the count of garbage to be processed and/or the count of the heaps of garbage to be processed. The management platform may also determine the volume of garbage to be processed on different roads based on the coverage area and height of garbage and/or garbage heaps.

In some embodiments, the relevant information of the target object further includes the people flow. For the contents of the people flow, please refer to FIG. 7 and the related descriptions thereof.

Step 630: determining the at least one target garbage cleaning point based on the relevant information of the target object.

The target garbage cleaning point refers to a garbage cleaning point that needs to be processed. For example, the target garbage cleaning point may be a road with the highest amount of garbage to be processed. For more descriptions of the target garbage cleaning point, please refer to the related descriptions of FIG. 2.

In some embodiments, the management platform may rank the amount of garbage to be processed on the at least one road, and use the top-ranked (e.g., top 10, top 20, etc.) roads as the target garbage cleaning points. In some embodiments, the management platform may take the roads with the amount of garbage to be processed exceeding a threshold (e.g., the level of garbage amount exceeds "average" and/or the coverage area of the garbage exceeds 5 square meters, etc.) as the target garbage clearing points.

In some embodiments of the present disclosure, by determining the target object and information of the target object through the monitoring information to determine the target garbage cleaning point, the road with a large amount of garbage can be cleaned in time, so as to avoid inconvenience or bad experience for pedestrians due to too much garbage and improve the urban living environment.

In some embodiments, the management platform may generate the remote control command based on the at least one target garbage cleaning point and send the remote control command to the sensor network platform, and send the remote control command to the object platform based on the sensor network platform to cause the object platform perform the cleaning operation.

The remote control command refers to a control command sent by the management platform, such as a command sent by the management platform to perform the cleaning operation on the target garbage cleaning point.

In some embodiments, the management platform may determine the garbage cleaning route as the remote control command according to the at least one target garbage cleaning point. For more contents about the remote control command, please refer to FIG. 2 and the related descriptions thereof.

The cleaning operation refers to the cleaning of the garbage to be processed. For example, the cleaning operation may be cleaning the garbage to be processed on the road by cleaning workers, or the like.

In some embodiments, in response to the remote control command, the object platform may perform the garbage cleaning through a cleaning robot based on the remote control command. In some embodiments, the object platform may send the garbage cleaning route in the remote control command to the person and/or the unit in charge of garbage cleaning, and the person and/or the unit in charge organizes personnel for cleaning.

In some embodiments of the present disclosure, the remote control command is generated based on the at least one target garbage cleaning point and sent to the object platform to perform the cleaning operation, so that the garbage to be processed on the road can be monitored in real time, the garbage on the road can be cleaned in time, and the urban living environment and the image of the city can be improved.

Figure 7:
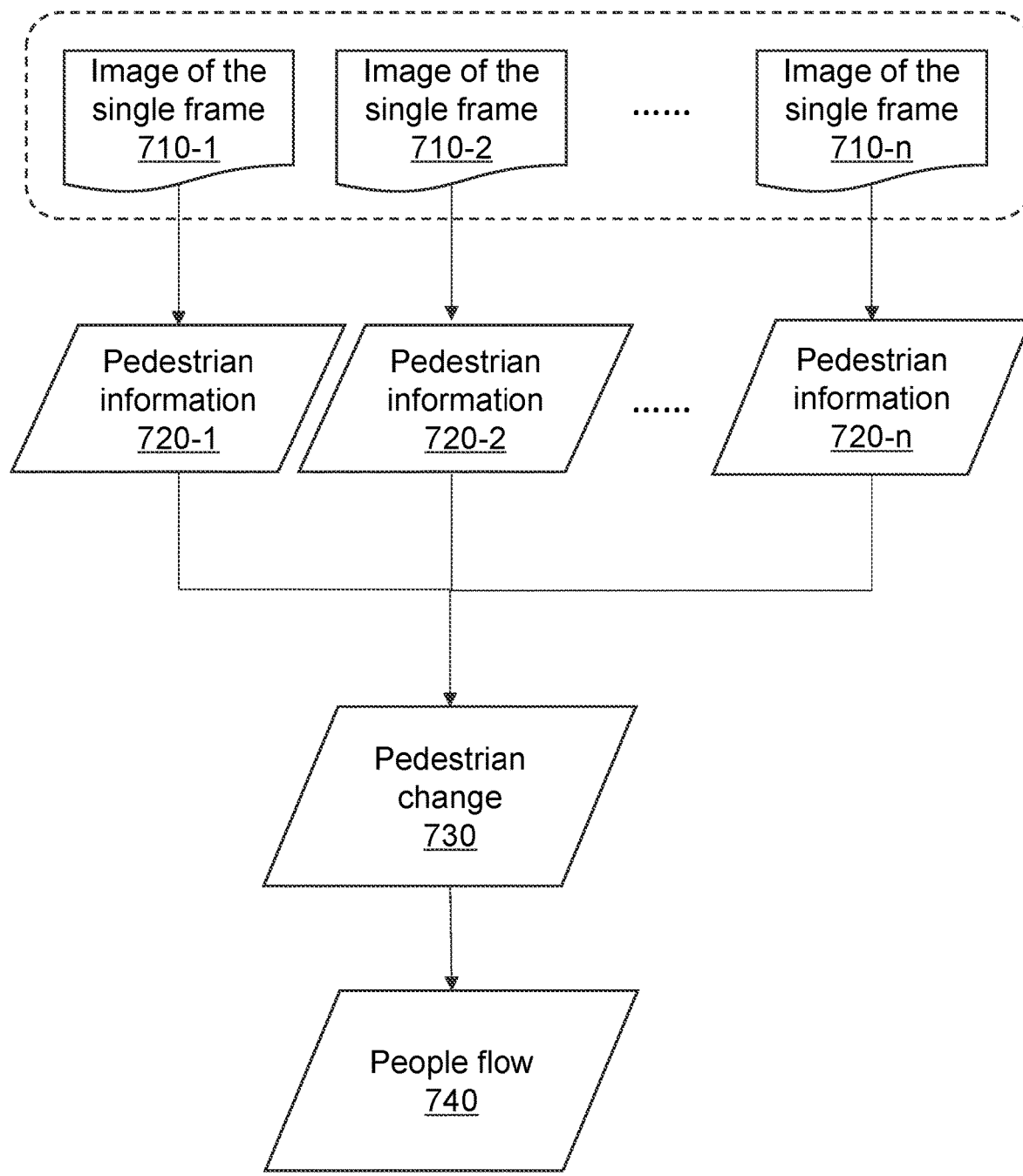
FIG. 7 is a schematic diagram illustrating an exemplary process for determining relevant information of a target object according to some embodiments of the present disclosure.

FIG. 7 is a schematic diagram illustrating an exemplary process for determining relevant information of a target object according to some embodiments of the present disclosure.

In some embodiments, the target object may also include pedestrians, and the relevant information of the target object may also include the people flow. The management platform may determine a pedestrian change based on pedestrian information, and determine the people flow based on the pedestrian change, the pedestrian information is the recognition result obtained by recognizing an image of a single frame, and the pedestrian change is the recognition result obtained by recognizing images of a plurality of frames.

The pedestrians refer to people who pass through the road corresponding to the monitoring information. For example, the pedestrians may be people passing on the way to and from work.

In some embodiments, the management platform may recognize at least one contour in the image based on the pixel distribution, gray value, etc., of the image in the monitoring information, compare the at least one contour in the image with the contour of a human body, and then recognize the pedestrians on the road. In some embodiments, the management platform may take a pedestrian in the monitoring image of at least one frame in the recognized monitoring information as the target object.

The pedestrian information refers to information related to pedestrians. For example, the pedestrian information may be the clothing information of the pedestrian, face information of the pedestrian, or the like. The pedestrian information of each pedestrian is different.

In some embodiments, the management platform may recognize the color, pattern, and other pixels of the clothing of the pedestrian to determine clothing features of the pedestrian, and use the clothing features of the pedestrian as the pedestrian information. In some embodiments, the management platform may recognize facial features of the pedestrian based on a face recognition algorithm, and use the facial features of the pedestrian as the pedestrian information. In some embodiments, each set of pedestrian information corresponds to a pedestrian.

The pedestrian change refers to a change of the pedestrian. For example, if there are pedestrians A, B, C, and D in the image at 9:00, and there are pedestrians A, C, and D in the image at 9:10, then one pedestrian (B) changes. In some embodiments, the pedestrian change may be expressed as a number, as in the example shown above, the pedestrian change is 1. In some embodiments, the pedestrian change may be a pedestrian newly appearing on the image screen or a pedestrian leaving the image screen.

In some embodiments, as shown in FIG. 7, a plurality of images of the single frame 710-1, 710-2, . . . , 710-n are arranged in a time series, and the management platform may perform a comparison on the pedestrian information 720-1, 720-2, . . . , 720-n recognized in the images of the single frame to determine the pedestrian change. For example, the pedestrian information 720-2 recognized in the image of the single frame 710-2 is compared with the pedestrian information 720-1 recognized in the previous image of the single frame 710-1 to determine the pedestrian change 730.

The people flow refers to the count of pedestrians passing through on the road within the unit time. For example, the people flow of a certain road is 10 people/min, etc.

In some embodiments, the management platform may determine the people flow 740 in different time periods by counting a plurality of pedestrian changes 730 during different time periods. For example, a time interval between the shooting times of adjacent images of the single frame is 10 seconds, and the management platform may determine 6 pedestrian changes by comparing the information of each two adjacent pedestrians based on the pedestrian information of 7 images of the single frame between 9:00 and 9:01 (including the time at the two endpoints), and obtain the people flow from 9:00 to 9:01 by adding the 6 pedestrian changes.

In some embodiments of the present disclosure, the people flow of the target object is determined by recognizing the image of the single frame and the images of the plurality of frames, and the road with a larger people flow can be determined as the target garbage cleaning point, and then the road with larger people flow can be prioritized for cleaning, which can reduce the impact of the garbage to be processed on pedestrians as much as possible.

In some embodiments, the relevant information of the target object may further include a first pedestrian comfort level on each road of the at least one road. The management platform may determine the first pedestrian comfort level based on a travel speed of the pedestrian passing through the garbage gathering point on each road and a dwell time of the pedestrian on each road.

The first pedestrian comfort level refers to a comfort level of the pedestrian passing through the road. For example, when there is no or less garbage to be processed on the road, the first pedestrian comfort level is higher. As another example, when there is a lot of garbage to be processed on the road, the garbage to be processed may have peculiar smell and affect the passage of pedestrians (e.g., the garbage to be processed blocking the road, the garbage to be processed easily to be stepped on, etc.), etc., and the first pedestrian comfort level is lower.

In some embodiments, the management platform may determine the first pedestrian comfort level based on the travel speed of the pedestrian passing through the garbage gathering point on each road and the dwell time of the pedestrian on each road.

The garbage gathering point is a place where the garbage accumulates, such as garbage bins on the road, locations where garbage accumulates in large quantities, etc.

In some embodiments, the management platform may determine the garbage gathering point in various ways. For example, the management platform may recognize the place where a large amount of garbage is accumulated in the image based on the amount of garbage to be processed, and determine the place where the garbage accumulation exceeds an area threshold (e.g., 2 square meters, etc.) as the garbage gathering point. As another example, the management platform may recognize a garbage collection facility (e.g., a garbage can, a garbage bin, a garbage truck, etc.) in the image and use the garbage collection facility as the garbage gathering point.

The travel speed refers to a speed when the pedestrian travels. For example, the travel speed may be the speed of the pedestrian passing through a garbage heap. The pedestrian passing through the garbage gathering point is faster, the pedestrian wants to leave the garbage gathering point on the road as soon as possible, indicating that the first pedestrian comfort level corresponding to the road is lower.

In some embodiments, the management platform may recognize the locations of the pedestrian in the images of the plurality of frames corresponding to different adjacent time points, then calculate the distance traveled by the pedestrian, and calculate the travel speed of the pedestrian in combination with the times corresponding to the images of the plurality of frames.

The dwell time refers to a duration that pedestrian appears and stays. For example, the dwell time may be a duration of the pedestrian walking on a certain road. The shorter the average dwell time of the pedestrian is, the less the willing of the pedestrian to stay on the road is, and the lower the first pedestrian comfort level corresponding to the road is.

In some embodiments, the management platform may recognize images in which the location of the pedestrian does not change in the consecutive images of the plurality of frames sorted in the time series and an image of a first frame in which the location of the pedestrian changes then, and calculate the dwell time of the pedestrian based on the time corresponding to the images in which the position of the pedestrian does not change in the consecutive images of the plurality of frames. For example, the pedestrian is located at a point C in the images of the plurality of frames from 10:00 to 10:10, and the location of the pedestrian in the image changes at 10:10:01, that is, the dwell time of the pedestrian at the point C is 10 minutes.

In some embodiments, the management platform may comprehensively judge the first pedestrian comfort level on each road based on the travel speed and the dwell time. For example, the management platform may calculate the first pedestrian comfort level F on each road by formula (3):

$$F=k_1(T-T_0)-k_2(V-V_0) \quad (3).$$

Where, $k_1$, $k_2$ are coefficients greater than 0, and the specific values may be set according to specific needs; T is an average dwell time of the pedestrian, $T_0$ is a reference average dwell time, V is the travel speed of passing through the garbage gathering point, and $V_0$ is a reference travel speed.

The management platform may determine $T_0$ based on the average dwell time of the pedestrian on a corresponding road with no garbage or less garbage under the same condition. The management platform may determine $V_0$ based on the speed of the pedestrian passing through the corresponding road with no garbage under the same condition. The same condition may include the same time period (e.g., 9:00-10:00 a.m.).

For example, $T_0$ and $V_0$ may be the average dwell time and the average travel speed of the pedestrian on the road during the same time period in the historical data. $T_0$ and $V_0$ corresponding to different time periods may be different. The longer the average dwell time is, the smaller the impact of garbage on the pedestrian comfort level is, and the higher the first pedestrian comfort level is. The greater the traveling speed V through the garbage gathering point is, the greater the impact of garbage on the pedestrian comfort level is, and the lower the first pedestrian comfort level is. $k_1$, $k_2$, $T_0$, and $V_0$ in the formula (3) corresponding to the first pedestrian comfort level on each road of the at least one road may be the same or different, and may be set by the management platform according to the actual situation on each road.

In some embodiments, the management platform may also calculate the first pedestrian comfort level through other formulas or manners (e.g., direct difference calculation, etc.).

In some embodiments of the present disclosure, the first pedestrian comfort level is determined by the dwell time and the travel speed, the road with lower first pedestrian comfort level may be determined as the target garbage cleaning point, and then the road with more obvious impact on the pedestrians may be cleaned up in time, thereby reducing the impact of the garbage to be processed on the pedestrians.

In some embodiments, the relevant information of the target object may further include a second pedestrian comfort level on each road of the at least one road at the future time. The management platform may predict the second pedestrian comfort level through a comfort level prediction model based on the historical pedestrian comfort levels on each road at a plurality of historical times, and the comfort level prediction model may be a machine learning model.

The second pedestrian comfort level at the future time refers to a comfort level of the pedestrian passing through the road at a certain time in the future from the current time, for example, the comfort level of the pedestrian on the road D at one hour after the current time.

The historical pedestrian comfort level at the historical time refers to a pedestrian comfort level at a past time, such as the pedestrian comfort levels on the road E at a plurality of times of a day (e.g., 7:00, 9:00, 12:00, etc.) in the past month. In some embodiments, the management platform may directly read the first pedestrian comfort levels at a plurality of past times in a historical database as the historical pedestrian comfort levels at the historical times.

In some embodiments, the management platform may predict the second pedestrian comfort level on each road through a comfort level prediction model based on the historical pedestrian comfort levels on each road at the plurality of historical times.

In some embodiments, the comfort level prediction model may be a time series machine learning model, such as a Recurrent Neural Network (RNN) model, a Long Short-Term Memory Network (LSTN) model, etc.

In some embodiments, an input of the comfort level prediction model may include historical pedestrian comfort levels on a certain road at the plurality of historical times. An output of the comfort level prediction model may include the second pedestrian comfort level on the road at the future time.

The parameters of the comfort level prediction model may be obtained through training. In some embodiments, the comfort level prediction model may be obtained by training a plurality of sets of comfort level training samples with comfort level labels. For example, the plurality of sets of comfort level training samples with the comfort level labels may be inputted into an initial comfort level prediction model, a loss function may be constructed based on the comfort level labels and the output results of the initial comfort level prediction model, and the parameters of the comfort level prediction model may be iteratively updated based on the loss function. When the loss function of the initial comfort level prediction model satisfies the preset requirements, the model training is completed, and a trained comfort level prediction model is obtained. The preset requirements may be that the loss function converges, the count of iterations reaches a threshold, or the like.

In some embodiments, each set of comfort training samples may include historical pedestrian comfort levels on each road at the plurality of historical times. Each set of comfort level labels may be the actual first pedestrian comfort level after a certain time in the future corresponding to each set of comfort level training samples. In some embodiments, the comfort level training samples and the comfort level labels may be obtained based on the historical first pedestrian comfort levels.

In some embodiments of the present disclosure, the second pedestrian comfort level at the future time of each road can be estimated through the comfort level prediction model, so as to realize intelligent estimation of the second pedestrian comfort level at the future time. By estimating the second pedestrian comfort level on each road at the future time, the road with a lower second pedestrian comfort level can be determined as the target garbage cleaning point, and then the road with obvious impact on the pedestrians at the future time can be cleaned up in time, which can further minimize the impact of the garbage to be processed on the pedestrians at the future time.

FIG. 8 is another flowchart illustrating an exemplary process for determining at least one target garbage cleaning point according to some embodiments of the present disclosure. As shown in FIG. 8, a process 800 includes the following steps. In some embodiments, the process 800 may be performed by the management platform.

Step 810: determining at least one road where the amount of garbage satisfies a predetermined condition as at least one candidate garbage cleaning point.

The predetermined condition may refer to a pre-customized relevant condition limiting the amount of garbage on the road. For example, the predetermined condition may be that the amount of the garbage to be processed exceeds a first garbage amount threshold. The first garbage amount threshold may refer to a volume of garbage on the road. For example, the first garbage amount threshold is 3 cubic meters, 5 cubic meters, etc.

The candidate garbage cleaning points are streets that is possible of being selected as the target garbage cleaning points, such as roads with a larger amount of garbage.

In some embodiments, the management platform may determine the road where the amount of garbage to be processed exceeds the first garbage amount threshold as the candidate garbage cleaning point. For example, when the first garbage amount threshold is that the garbage amount level of the garbage to be processed is average, if the garbage amount level of the road F is more, the road F is determined as the candidate garbage cleaning point.

Step 820, determining the at least one target garbage cleaning point based on the at least one candidate garbage cleaning point.

In some embodiments, the management platform may use the candidate garbage cleaning point of which the amount of garbage exceeds a second garbage amount threshold as the target garbage cleaning point, and the second garbage amount threshold is greater than the first garbage amount threshold. In some embodiments, the management platform may sort the amount of garbage to be processed in the candidate garbage cleaning points, and use the candidate garbage cleaning points with a higher rank (e.g., the top 5, top 10, etc.) as the target garbage cleaning points. In some embodiments, the management platform may sort the first pedestrian comfort levels of the roads corresponding to the candidate garbage cleaning points, and take the candidate garbage cleaning points with a lower first pedestrian comfort level (e.g., the last 5, the last 10, etc.) as the target garbage cleaning points. For more descriptions about the first pedestrian comfort level, please refer to the related descriptions of FIG. 7.

In some embodiments of the present disclosure, by taking the road with the amount of garbage satisfying the predetermined condition as the candidate garbage cleaning point, and then determining the target garbage cleaning point, the road with a larger amount of garbage can be cleaned first, so as to avoid the excessive accumulation of garbage that affects the city image and the living environment.

In some embodiments, the management platform may also obtain a garbage growth rate for each of the at least one candidate garbage cleaning point. The management platform may determine the at least one target garbage cleaning point based on the garbage growth rate.

The garbage growth rate refers to an increased amount of garbage to be processed within the unit time. Different candidate garbage cleaning points correspond to different garbage growth rates. For example, the amount of garbage to be processed at the candidate garbage cleaning point G is 1 cubic meter at 9:00 a.m. and 5 cubic meters at 11:00 a.m., then the garbage growth rate of the candidate garbage cleaning point G is 2 cubic meters/h. As another example, the garbage amount of a candidate garbage cleaning point H is 2 cubic meters at 9:00 a.m. and 3 cubic meters at 11:00 a.m., then the garbage growth rate of candidate garbage cleaning point H is 0.5 cubic meters/h.

In some embodiments, the management platform may calculate a difference between the amount of garbage to be processed on the road at two times and calculate the garbage growth rate according to the difference and the duration.

In some embodiments, the garbage growth rate is related to the people flow on the road corresponding to the garbage growth rate. For example, the garbage growth rate and the people flow on the road corresponding to the garbage growth rate are positively correlated. The larger the people flow is, the larger the garbage growth rate on the corresponding road is. Exemplarily, when the people flow on a certain road is larger, more people may generate garbage on the road, and the garbage growth rate corresponding to the road may be larger.

In some embodiments, the management platform may determine the correspondence relationship between the people flow and the garbage growth rate based on historical data and determine the garbage growth rate according to the correspondence relationship. The correspondence relationship may be a function, a comparison table, or the like.

In some embodiments of the present disclosure, the garbage growth rate is determined by the people flow, which can make the garbage growth rate more accurate.

In some embodiments, the management platform may determine the candidate garbage cleaning points with the highest garbage growth rate (e.g., the top 5, the top 10, etc.) as the target garbage cleaning points by calculating the garbage growth rate of the at least one candidate garbage cleaning point and sorting the garbage growth rate of the at least one candidate garbage cleaning point.

In some embodiments, the management platform may set different preset growth rate values for different candidate garbage cleaning points, and use the candidate garbage cleaning point of which the growth rate exceeds the preset growth rate value as the target garbage cleaning point. The preset growth rate values may be obtained based on the historical data. For example, the preset growth rate values may be the medians of the growth rates of a plurality of time periods in the historical data, etc.

In some embodiments of the present disclosure, the target garbage cleaning point is determined through the growth rate, and the cleaning operation can be performed on the road with a larger growth rate of the garbage amount. When the road is relatively clean, people may tend to keep the road clean, which can reduce the garbage growth rate on the road.

In some embodiments, the management platform may also determine the target garbage cleaning point based on values of the candidate garbage cleaning points. For more contents about determining the target garbage cleaning point based on the values of the candidate garbage cleaning points, please refer to FIG. 9 and the related descriptions thereof.

Figure 9:
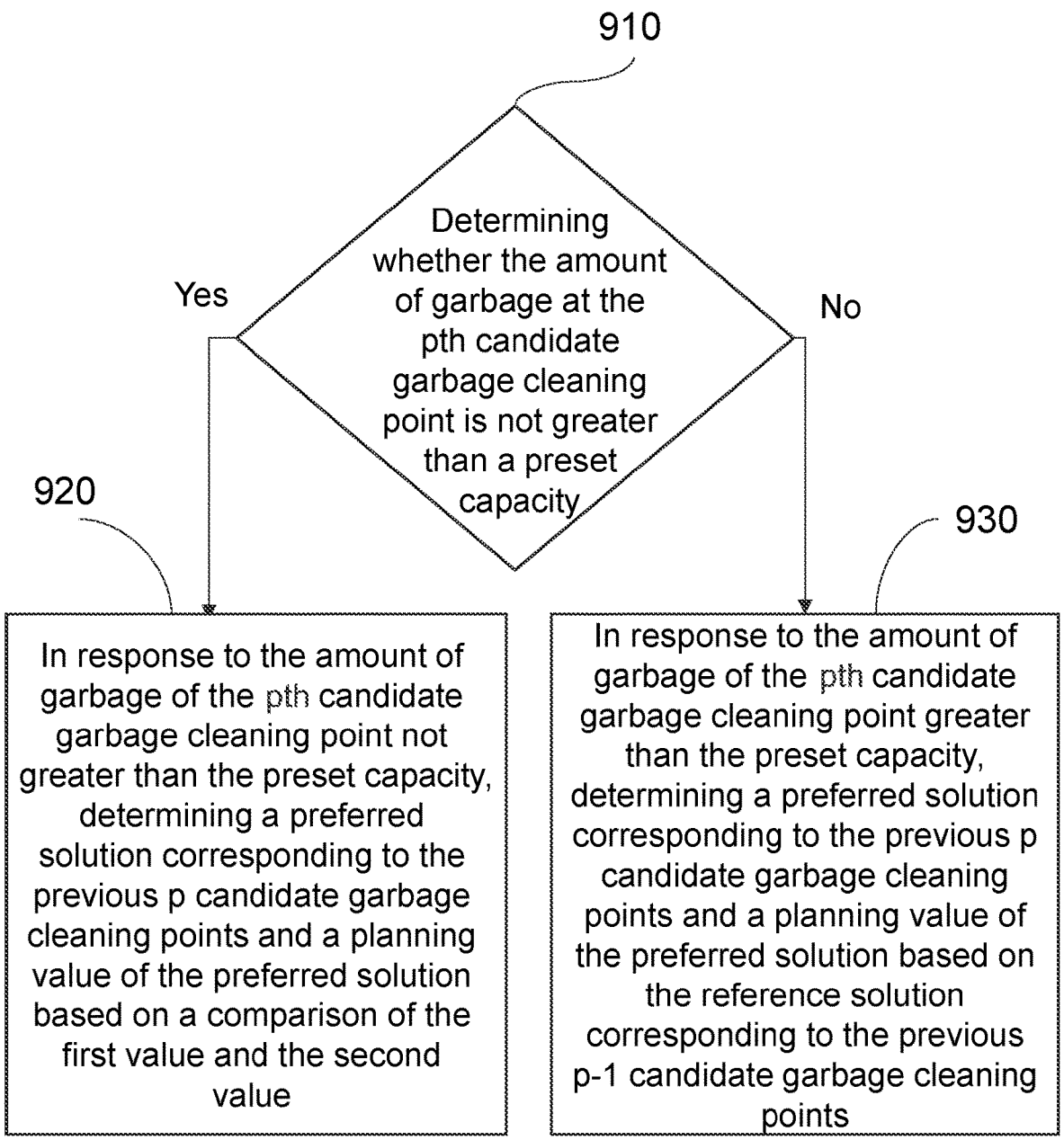
FIG. 9 is another flowchart illustrating an exemplary process for determining at least one target garbage cleaning point according to some embodiments of the present disclosure.

FIG. 9 is another flowchart illustrating an exemplary process for determining at least one target garbage cleaning point according to some embodiments of the present disclosure. As shown in FIG. 9, a process 900 includes the following steps. In some embodiments, the process 900 may be performed by the management platform.

In some embodiments, the management platform 130 may determine at least one candidate garbage cleaning point in the preferred solution corresponding to top p candidate garbage cleaning points as the at least one target garbage cleaning point.

The top p candidate garbage cleaning points refer to p candidate garbage cleaning points before any one candidate garbage cleaning point after the candidate garbage cleaning points are arranged in any order. The value of p may be a natural number, such as 1, 2, 3 . . . , etc. The maximum value of p may be the count of candidate garbage cleaning points. In some embodiments of the present disclosure, p starts from the maximum value of q. q is the count of the candidate garbage cleaning points.

The preferred solution refers to an optimal solution selected from various feasible garbage cleaning solutions by following the principle of choosing the best by comparison. For example, the preferred solution may be a solution with the largest sum of values of the candidate garbage cleaning points among the garbage cleaning solutions. The garbage cleaning solution may include specific candidate garbage cleaning points to be cleaned. The values of the candidate garbage cleaning points may be benefits such as the increase in the people flow and the improvement of the pedestrian comfort level brought about by cleaning the candidate garbage cleaning points.

In some embodiments, the value of the candidate garbage cleaning point is proportional to the amount of garbage at the candidate garbage cleaning point, and the larger the amount of garbage is, the larger the value of the candidate garbage cleaning point is.

In some embodiments, the value of the at least one candidate garbage cleaning point is also related to the pedestrian comfort level of the at least one candidate garbage cleaning point at the current time.

The pedestrian comfort level at the current time refers to the comfort level of the pedestrian at the current time when passing through the road of the candidate garbage cleaning point.

In some embodiments, the lower the pedestrian comfort level at the current time is, the larger the value of the candidate garbage cleaning point is. For example, the current time is $t_0$, the garbage truck is currently located at the candidate garbage cleaning point A, and the value of the garbage truck going to the candidate garbage cleaning point B is related to the pedestrian comfort level of the candidate garbage cleaning point B at the current time (i.e., $t_0$). The lower the pedestrian comfort level of the candidate garbage cleaning point B at the current time (i.e., $t_0$) is, the greater the improvement in the pedestrian comfort level brought by the garbage truck going to the candidate garbage cleaning point B for garbage cleaning is, and the larger the value of the candidate garbage cleaning point B is. At time $t_1$, the garbage truck is cleaning at the candidate garbage cleaning point B, and the value of the garbage truck going to the candidate garbage point C is also related to the pedestrian comfort level at the current time (i.e., $t_1$).

In some embodiments, the management platform may determine the pedestrian comfort level at the current time through the comfort level prediction model. For more contents about the comfort level prediction model, please refer to FIG. 7 and the related descriptions thereof.

In some embodiments of the present disclosure, by associating the pedestrian comfort level at the current time with the value of the candidate garbage cleaning point, the improvement in the pedestrian comfort level brought by garbage cleaning can be fully considered, which can make the value of the candidate garbage cleaning point more convincing.

In some embodiments, the value of the at least one candidate garbage cleaning point is also related to the estimated people flow at the future time after cleaning of the at least one candidate garbage cleaning point.

The estimated people flow at the future time after cleaning refers to an estimated people flow at the future time after the garbage is cleaned. For example, the estimated people flow at the future time after cleaning is a people flow within 1 hour after the garbage is cleaned.

In some embodiments, the larger the estimated people flow at the future time after cleaning is, the larger the value of the candidate garbage cleaning point is. For example, 9:00 a.m. is a peak time for work, after the candidate garbage cleaning point D is cleaned at 8:00, the estimated people flow in the next hour is large, and the value of the candidate garbage cleaning point D is large at this time. 1:00 p.m. is the lunch break, after the candidate garbage cleaning point D is cleaned at 12:00 noon, the estimated people flow in the next hour is small, and the value of the candidate garbage cleaning point is low at this time.

In some embodiments of the present disclosure, by associating the estimated people flow at the future time after cleaning with the value of the candidate garbage cleaning point, the change in the people flow brought by garbage cleaning can be fully considered, which can better explain the value of cleaning the candidate garbage cleaning point.

In some embodiments, the management platform may determine the estimated people flow at the future time after cleaning through the people flow prediction model. The people flow prediction model may be a time series machine learning model based on network structures, such as Recurrent Neural Network (RNN), Long Short-Term Memory Network (LSTN), etc.

In some embodiments, an input of the people flow prediction model may be the historical people flows on a certain road at the plurality of historical times corresponding to the future time, and an output of the people flow prediction model may be the estimated people flow on the road at the future time after cleaning.

The parameters of the people flow prediction model may be obtained through training. In some embodiments, the people flow prediction model may be obtained by training a plurality of sets of people flow training samples with people flow labels. For example, the plurality of sets of people flow training samples with the people flow labels may be inputted into an initial people flow prediction model, a loss function may be constructed based on the people flow labels and the output results of the initial people flow prediction model, and the parameters of the people flow prediction model may be iteratively updated based on the loss function. When the loss function of the initial people flow prediction model satisfies the preset requirements, the model training is completed, and a trained people flow prediction model is obtained. The preset requirements may be that the loss function converges, the count of iterations reaches a threshold, or the like.

In some embodiments, each set of people flow training samples may include the historical people flows on each sample road at the plurality of historical times corresponding to the future time. Each set of people flow labels may be the actual people flow at the future time after cleaning corresponding to each set of people flow training samples. In some embodiments, the people flow training samples and the people flow labels may be obtained directly from a historical database.

In some embodiments of the present disclosure, the estimated people flow at the future time after cleaning can be automatically predicted by the people flow prediction model, which can make the estimated people flow at the future time after cleaning more efficient.

In some embodiments, the management platform may randomly combine the candidate garbage cleaning points to form a plurality of garbage cleaning solutions. The total amount of garbage to be processed in the randomly combined garbage cleaning solutions may not exceed the capacity of the garbage truck. The management platform may select the garbage cleaning solution with the largest total value of the plurality of candidate garbage cleaning points included in the plurality of garbage cleaning solutions as the preferred solution. In some embodiments, the management platform may further determine the preferred solution by performing steps 910-930.

Step 910: determining whether the amount of garbage of the pth candidate garbage cleaning point is not greater than a preset capacity.

The preset capacity refers to a preset capacity of the garbage truck. The preset capacity may be any value less than or equal to the remaining capacity of the garbage truck. For example, at the pth candidate garbage cleaning point, the remaining capacity of the garbage truck is 20 cubic meters, and the preset capacity may be any value less than or equal to 20 cubic meters.

In some embodiments, the management platform may determine the preset capacity based on a preset rule. The preset rule may be a rule preset in advance on how to determine the preset capacity. For example, the preset rule may be to calculate the remaining capacity of the garbage truck as the preset capacity. Exemplarily, the preset capacity may be represented by $W=U-\Sigma w_x$, where U is the total available capacity of the garbage truck, and $\Sigma w_x$ is the sum of the garbage amount of the candidate garbage points selected from qth to (p+1)th candidate garbage point.

In some embodiments, the management platform may determine whether the amount of garbage at the pth candidate garbage cleaning point is not less than the preset capacity by making a difference. For example, a difference is made between the amount of garbage at the pth candidate garbage cleaning point and the preset capacity, if the difference between "the amount of garbage and the preset capacity" is greater than or equal to 0, the amount of garbage of the pth candidate garbage cleaning point is not less than the preset capacity. If the difference is less than 0, the amount of garbage of the pth candidate garbage cleaning point is less than the preset capacity.

Step 920: in response to the amount of garbage of the pth candidate garbage cleaning point not greater than the preset capacity, determining a preferred solution corresponding to the previous p candidate garbage cleaning points and a planning value of the preferred solution based on a comparison of the first value and the second value.

The first value refers to the total value of the candidate garbage cleaning points in the preferred solution under the premise that the pth candidate garbage cleaning point is not included. For example, when the current candidate garbage cleaning point is the 10th candidate garbage cleaning point, the first value is the value of the preferred solution that does not include the 10th candidate garbage cleaning point, i.e., only the first 9 candidate garbage cleaning points are considered.

In some embodiments, the first value may be determined based on the preferred solution that does not include the pth candidate garbage cleaning point.

In some embodiments, the first value may be represented by formula (4):

$$f_1 = f(p-1, W) \qquad (4).$$

Where $f_1 = f(p-1, W)$ refers to the value of the preferred solution of cleaning the previous p−1 candidate garbage cleaning points by the garbage truck under a condition of the available capacity W (the available capacity is the same as the preset capacity at this time).

In some embodiments, the management platform may determine the preferred solution of cleaning the previous p−1 candidate garbage cleaning points on the premise that the pth candidate garbage cleaning point is not cleaned and calculate the value of the preferred solution as the first value $f_1$.

The second value refers to the total value of the candidate garbage cleaning points in the reference solution of the previous p−1 candidate garbage cleaning points and the pth candidate garbage cleaning point under the premise of cleaning the pth candidate garbage cleaning point. For example, when the current candidate garbage cleaning point is the 10th candidate garbage cleaning point, the second value is the total value of the candidate garbage cleaning points in the reference solutions of the previous 9 candidate garbage cleaning points and the 10th candidate garbage cleaning point.

In some embodiments, the second value may be determined based on the impact of the value of the pth candidate garbage cleaning point and the reference solution corresponding to the previous p−1 candidate garbage cleaning points. The solution capacity of the reference solution is related to the amount of garbage of the pth candidate garbage cleaning point.

The reference solutions refer to feasible solutions for selecting garbage cleaning points from the (p−1)th candidate garbage cleaning point to the first candidate garbage cleaning point, such as the garbage cleaning solution with the largest value of the previous p−1 candidate garbage cleaning points under a condition of a solution capacity.

The solution capacity is a remaining capacity after cleaning the pth candidate garbage cleaning point. For example, if the preset capacity is 18 cubic meters, and the amount of garbage of the pth candidate garbage cleaning point is 3 cubic meters, the solution capacity of the reference solution is 15 cubic meters.

In some embodiments, the management platform may calculate a difference between the preset capacity and the amount of garbage of the pth candidate garbage cleaning point and determine the difference as the solution capacity of the reference solution.

In some embodiments, the second value may be represented by formula (5):

$$f_2 = f(p-1, W-w_p) + v_p \quad (5).$$

Where $f(p-1, W-w_p)$ refers to the maximum value brought by the reference solution that the garbage truck cleans the previous p−1 candidate garbage cleaning points under the condition of the available capacity $W-w_p$ (at this time, the available capacity is equal to a result of subtracting the amount of garbage of the pth candidate garbage cleaning point from the preset capacity), $w_p$ is the amount of garbage of the pth candidate garbage cleaning point, and $v_p$ is the value of cleaning the pth candidate garbage cleaning point.

In some embodiments, the management platform may determine the reference solution of the previous p−1 candidate garbage cleaning points on the premise of cleaning the pth candidate garbage cleaning point and calculate the total value of the pth candidate cleaning point and the candidate garbage cleaning points in the reference solution as the second value $f_2$.

The planning value refers to the total value of the target garbage cleaning points selected according to the preferred solution, such as the total revenue after all candidate garbage cleaning points in the preferred solution are cleaned.

In some embodiments, the management platform may compare the first value and the second value and use the larger value as the planning value. The planning value may be expressed by formula (6):

$$f(p,W) = \max(f_1, f_2) = \max(f(p-1,W), f(p-1,W-w_p)+v_p) \quad (6).$$

Where f(p−1, W) and f(p−1, W) may be determined by executing steps 910-930 after determining the size relationship between the amount of garbage of the (p−1)th candidate garbage cleaning point and the corresponding preset capacity/available capacity. For example, when the amount of garbage of the (p−1)th candidate garbage cleaning point is not greater than the corresponding preset capacity, $f(p-1, W) = \max(f(p-2, w_{p-1}), f(p-2, w_{p-1}-w_{p-2})+v_{p-1})$, where $w_{p-1}$ is the preset capacity corresponding to the (p−1)th candidate garbage cleaning point, $w_{p-2}$ is the amount of garbage of the (p−2)th candidate garbage cleaning point, and $v_{p-1}$ is the value of the pth candidate garbage cleaning point. The management platform may perform a recursion according to the above manner until the planning value f(p, W) is determined. When the count of candidate garbage cleaning points is 0, selecting the candidate garbage cleaning points of which the preset capacity or the available capacity does not exceed W or $W-w_p$ from the 0 candidate garbage cleaning point represents that there is no corresponding candidate garbage cleaning point and the value at this time is 0. When the preset capacity or the available capacity is 0, selecting the candidate garbage cleaning points with the preset capacity or the available capacity of 0 from the p candidate garbage cleaning points represents that there is no corresponding candidate garbage cleaning point and the value at this time is 0.

The management platform may determine the at least one candidate garbage cleaning point in the candidate solution corresponding to the planning value as the at least one target garbage cleaning point.

Step 930, in response to the amount of garbage of the pth candidate garbage cleaning point greater than the preset capacity, determining a preferred solution corresponding to the previous p candidate garbage cleaning points and a planning value of the preferred solution based on the reference solution corresponding to the previous p−1 candidate garbage cleaning points.

In some embodiments, the management platform 130 may determine the maximum value f(p−1, W) corresponding to the previous p−1 candidate garbage cleaning points under the condition of the available capacity W (at this time, the available capacity is equal to the preset capacity) and use the maximum value as the planning value. The maximum value of the previous p−1 candidate garbage cleaning points may be determined by executing steps 910-930 when p=p−1. For example, the steps include: determining the relationship between the (p−1)th candidate garbage point and the corresponding preset capacity; and when the amount of garbage of the (p−1)th candidate garbage cleaning point is not greater than the corresponding preset capacity, performing a recursion on $f(p-1, W) = \max(f(p-2, W), f(p-2, W-w_{p-1})+v_{p-1})$ according to the formula (6) and related descriptions thereof to determine the planning value.

In some implementations of the present disclosure, determining the target garbage cleaning point based on the preferred solution can improve the comfort level of more pedestrians after garbage cleaning, increase the people flow on the road, and significantly improve the living environment.

It should be noted that the above descriptions about the process 900 is only for illustration and description, and does not limit the scope of application of the present disclosure. For those skilled in the art, various modifications and changes can be made to the process 900 under the guidance of the present disclosure. However, such modifications and changes are still within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by +20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for planning a garbage cleaning route in a smart city, implemented by a management platform of an Internet of Things (IoT) system for planning a garbage cleaning route in a smart city, comprising:
   obtaining monitoring information on at least one road in a road network area, and recognizing a garbage accumulation situation on the at least one road;
   determining at least one target garbage cleaning point based on the garbage accumulation situation, wherein further includes:
   determining flow information on the at least one road by obtaining the monitoring information on the at least one road in the road network area, wherein the flow information includes a people flow;
   determining at least one target garbage cleaning point based on the garbage accumulation situation and the flow information; and
   determining a garbage cleaning route based on the at least one target garbage cleaning point.

2. The method of claim 1, wherein the IoT system for planning the garbage cleaning route in the smart city further includes: a user platform, a service platform, a sensor network platform, and an object platform;
   the service platform is configured to send the garbage cleaning route to the user platform;
   the object platform is configured to obtain the monitoring information on the at least one road in the road network area, and transmit the monitoring information to the management platform through the sensor network platform; and
   the method further includes:
   generating a remote control command and sending the remote control command to the sensor network platform based on the garbage cleaning route, and sending the remote control command to the object platform based on the sensor network platform to cause the object platform perform a cleaning operation.

3. The method of claim 1, wherein the flow information further includes an estimated people flow on each road of the at least one road at a future time, and the determining flow information on the at least one road by obtaining the monitoring information on the at least one road in the road network area includes:
   determining the estimated people flow through a people flow prediction model based on historical people flows on the each road at a plurality of historical times, wherein the people flow prediction model is a machine learning model.

4. The method of claim 1, wherein the flow information further includes a traffic flow.

5. The method of claim 4, wherein the flow information further includes an estimated traffic flow on each road of the at least one road at a future time, and the determining flow information on the at least one road by obtaining the monitoring information on the at least one road in the road network area includes:

determining the estimated traffic flow through a traffic flow prediction model based on historical traffic flows on the each road at a plurality of historical times, wherein the traffic flow prediction model is a machine learning model.

6. The method of claim 1, wherein the determining a garbage cleaning route based on the at least one target garbage cleaning point includes:

determining a planned route in a preferred solution of starting from an ith target garbage cleaning point and returning to a starting point as the garbage cleaning route, wherein determining the preferred solution of starting from the ith target garbage cleaning point and returning to the starting point includes:

in response to a preset set satisfying a preset condition, determining the preferred solution of starting from the ith target garbage cleaning point and returning to the starting point and a planning cost of the preferred solution based on a first cost of returning from the ith target garbage cleaning point to the starting point, wherein the preset set is a set of target garbage cleaning points excluding the starting point; and in response to the preset set not satisfying the preset condition, determining the preferred solution of starting from the ith target garbage cleaning point and returning to the starting point and the planning cost of the preferred solution based on a comparison of a plurality of second costs, wherein the plurality of second costs are determined based on a cost of starting from the ith target garbage cleaning point to a plurality of transfer target garbage cleaning points and a plurality of reference solutions of starting from the plurality of transfer target garbage cleaning points and returning to the starting point.

7. The method of claim 6, wherein the first cost or the second cost are also related to an estimated time to reach the target garbage cleaning point, and the estimated time to reach the target garbage cleaning point is related to a real-time traffic flow and an estimated traffic flow at a future time of each of the at least one target garbage cleaning point.

8. The method of claim 6, wherein the first cost or the second cost are also related to an estimated garbage growth rate after cleaning of reaching the target garbage cleaning point, the estimated garbage growth rate after cleaning is obtained by processing a garbage growth rate before cleaning and the garbage accumulation situation based on a growth rate prediction model, and the growth rate prediction model is a machine learning model.

9. The method of claim 8, wherein an input of the growth rate prediction model further includes a people flow of the target garbage cleaning point and an estimated people flow of the target garbage cleaning point at the future time.

10. A non-transitory computer-readable storage medium, wherein the storage medium stores computer instructions, and after reading the computer instructions in the storage medium, a computer executes the method for planning the garbage cleaning route in the smart city of claim 1.

11. An Internet of Things system for planning a garbage cleaning route in a smart city, comprising: a user platform, a service platform, a management platform, a sensor network platform, and an object platform;

the service platform configured to send a garbage cleaning route to the user platform;

the object platform configured to obtain monitoring information on at least one road in a road network area, and transmit the monitoring information to the management platform through the sensor network platform;

the management platform configured to:

obtain the monitoring information on the at least one road in the road network area, and recognize a garbage accumulation situation on the at least one road;

determine at least one target garbage cleaning point based on the garbage accumulation situation, wherein the management platform is further configured to:

determine flow information on the at least one road by obtaining the monitoring information on the at least one road in the road network area, wherein the flow information includes a people flow;

determine at least one target garbage cleaning point based on the garbage accumulation situation and the flow information;

determine the garbage cleaning route based on the at least one target garbage cleaning point; and generate a remote control command based on the garbage cleaning route, and send the remote control command to the sensor network platform; and the sensor network platform configured to send the remote control command to the object platform to cause the object platform perform a cleaning operation.

12. The Internet of Things system of claim 11, wherein the flow information further includes an estimated people flow on each road of the at least one road at a future time, and the management platform is further configured to:

determine the estimated people flow through a people flow prediction model based on historical people flows on the each road at a plurality of historical times, wherein the people flow prediction model is a machine learning model.

13. The Internet of Things system of claim 11, wherein the flow information further includes a traffic flow.

14. The Internet of Things system of claim 13, wherein the flow information further includes an estimated traffic flow on each road of the at least one road at a future time, and the management platform is further configured to:

determine the estimated traffic flow through a traffic flow prediction model based on historical traffic flows on the each road at a plurality of historical times, wherein the traffic flow prediction model is a machine learning model.

15. The Internet of Things system of claim 11, wherein the management platform is further configured to:

determine a planned route in a preferred solution of starting from an ith target garbage cleaning point and returning to a starting point as the garbage cleaning route, wherein determining the preferred solution of starting from the ith target garbage cleaning point and returning to the starting point includes:

in response to a preset set satisfying a preset condition, determining the preferred solution of starting from the ith target garbage cleaning point and returning to the starting point and a planning cost of the preferred solution based on a first cost of returning from the ith target garbage cleaning point to the starting point, wherein the preset set is a set of target garbage cleaning points excluding the starting point; and in response to the preset set not satisfying the preset condition, determining the preferred solution of starting from the ith target garbage cleaning point and returning to the starting point and the planning cost of the preferred solution based on a comparison of a plurality of second costs, wherein the plurality of second costs are determined based on a cost of starting from the ith target garbage cleaning point to a plurality of transfer target garbage cleaning points and a plurality of reference solutions of starting from the plurality of transfer target garbage cleaning points and returning to the starting point.

16. The Internet of Things system of claim 15, wherein the first cost or the second cost are also related to an estimated time to reach the target garbage cleaning point, and the estimated time to reach the target garbage cleaning point is related to a real-time traffic flow and an estimated traffic flow at a future time of each of the at least one target garbage cleaning point.

17. The Internet of Things system of claim 15, wherein the first cost or the second cost are also related to an estimated garbage growth rate after cleaning of reaching the target garbage cleaning point, the estimated garbage growth rate after cleaning is obtained by processing a garbage growth rate before cleaning and the garbage accumulation situation based on a growth rate prediction model, and the growth rate prediction model is a machine learning model.

18. The Internet of Things system of claim 17, wherein an input of the growth rate prediction model further includes a people flow of the target garbage cleaning point and an estimated people flow of the target garbage cleaning point at the future time.

* * * * *